US009411854B2

(12) United States Patent
Umezu

(10) Patent No.: US 9,411,854 B2
(45) Date of Patent: Aug. 9, 2016

(54) INFORMATION PROCESSING APPARATUS, INFORMATION PROCESSING SYSTEM, AND JUDGMENT RULE CONTROL METHOD

(75) Inventor: Keisuke Umezu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 577 days.

(21) Appl. No.: 13/583,591

(22) PCT Filed: Mar. 7, 2011

(86) PCT No.: PCT/JP2011/055850
§ 371 (c)(1),
(2), (4) Date: Sep. 7, 2012

(87) PCT Pub. No.: WO2011/111844
PCT Pub. Date: Sep. 15, 2011

(65) Prior Publication Data
US 2013/0041864 A1    Feb. 14, 2013

(30) Foreign Application Priority Data
Mar. 10, 2010    (JP) ................. 2010-053176

(51) Int. Cl.
G06F 17/30    (2006.01)
G06N 5/04    (2006.01)
G06N 5/02    (2006.01)

(52) U.S. Cl.
CPC ............ *G06F 17/30507* (2013.01); *G06N 5/02* (2013.01); *G06N 5/04* (2013.01)

(58) Field of Classification Search
None
See application file for complete search history.

(56) References Cited

U.S. PATENT DOCUMENTS

| 7,603,427 B1* | 10/2009 | Horvitz et al. ............... 709/207 |
| 2003/0065501 A1* | 4/2003 | Hamdan ................. G06F 9/465 704/1 |
| 2008/0318562 A1* | 12/2008 | Featherstone et al. ........ 455/418 |

FOREIGN PATENT DOCUMENTS

| JP | 2005-78372 A | 3/2005 |
| JP | 2006-309616 A | 11/2006 |
| WO | 2004/019225 A1 | 3/2004 |

OTHER PUBLICATIONS

Gellersen, H. et al. "Multi-sensor context-awareness in mobile devices and smart artifacts." Mobile Networks and Applications vol. 7 No. 5 (2002): pp. 341-351.*

(Continued)

*Primary Examiner* — Kakali Chaki
*Assistant Examiner* — Eric Nilsson
(74) *Attorney, Agent, or Firm* — Sughrue Mion, PLLC

(57) ABSTRACT

Disclosed is an information processing apparatus, wherein, upon defining an judgment method of determining the timing for presenting information, an appropriate judgment rule can be defined without any need for specialized knowledge, and without putting in much effort in setup work thereof. The information processing apparatus is provided with: an judgment-rule candidate generating unit for generating judgment rule candidates, which are combinations of a plurality of conditions combined on the basis of a rule; a materialization-estimate calculation unit for calculating judgment-rule materialization estimate values that indicate estimates of materialization frequencies for each of the judgment rule candidates, on the basis of a sensor availability rate within a period of time; and an judgment rule selection unit for selecting an judgment rule from among the judgment rule candidates, on the basis of the judgment-rule materialization estimate value and a notification amount that indicates the desired notification frequency of information.

30 Claims, 24 Drawing Sheets

(56) References Cited

OTHER PUBLICATIONS

Wang, Y. et al. "A framework of energy efficient mobile sensing for automatic user state recognition." Proceedings of the 7th international conference on Mobile systems, applications, and services. ACM, 2009.*

International Search Report for PCT/JP2011/055850 dated May 17, 2011.

Hiroto Aida et al., "A Probabilistic Inference Mechanism for Sensor-actuator Networks with Disconnected Operation", Transactions of Information Processing Society of Japan, 2007, pp. 459-470, vol. 48, No. 2.

* cited by examiner

Fig.2

640 CONDITION LIST

649 CONDITION

| TRAVELLING BY CAR |
| HUNGRY |
| WITH MY FRIEND |

Fig.3

651 CONDITION CONTENTS  652 CONDITION NUMBER

| TRAVELLING BY CAR | r1 |
| HUNGRY | r2 |
| WITH MY FRIEND | r3 |

Fig.4

653 JUDGMENT RULE CANDIDATE

| $r1 \times r2 \times r3$ |
| $r1 \times (r2 + r3)$ |
| $r2 \times (r1 + r3)$ |
| $r3 \times (r1 + r2)$ |
| $(r1 + r2 + r3)$ |

Fig.5

| 654 JUDGMENT RULE CANDIDATE |
|---|
| if("TRAVELLING BY CAR" AND "HUNGRY" AND "WITH MY FRIEND") then do |
| if("TRAVELLING BY CAR" AND ("HUNGRY" OR "WITH MY FRIEND")) then do |

Fig.6

| 631 SENSOR IDENTIFIER | 632 AVAILABILITY RATE |
|---|---|
| GPS | 1.00 |
| Motion sensor | 0.04 |
| Camera sensor | 0.20 |

639 SENSOR AVAILABILITY RATE

Fig.7

| 671 CONDITION CONTENTS | 672 SENSOR IDENTIFIER | 679 COMBINATION REQUIREMENT |
|---|---|---|
| TRAVELLING BY CAR | GPS | |
| HUNGRY | Motion sensor | |
| WITH MY FRIEND | Camera sensor | |

Fig.8

| 653 EACH JUDGMENT RULE CANDIDATE | 655 JUDGMENT RULE MATERIALIZATION-ESTIMATE VALUE |
|---|---|
| r1 × r2 × r3 | 0.008 |
| r1 × (r2+r3) | 0.24 |
| r2 × (r1+r3) | 0.048 |
| r3 × (r1+r2) | 0.208 |
| (r1+r2+r3) | 1.24 |

Fig.9

690 NOTIFICATION AMOUNT INFORMATION LIST

| 691 NOTIFICATION AMOUNT | 692 UPPER LIMIT | 693 LOWER LIMIT | 694 AVERAGE VALUE |
|---|---|---|---|
| ONCE A YEAR | 0.01 | 0.0001 | 0.00505 |
| ONCE A HALF YEAR | 0.02 | 0.0050 | 0.00125 |
| ONCE PER THREE MONTHS | 0.05 | 0.0100 | 0.03000 |
| ONCE A MONTH | 0.10 | 0.0300 | 0.06500 |

699 NOTIFICATION AMOUNT INFORMATION

Fig. 11

| 653A JUDGMENT RULE CANDIDATE |
|---|
| $r1 \times r2 \times r3$ |
| $r1 \times (r2 \oplus r3)$ |
| $r2 \times (r1 \oplus r3)$ |
| $r3 \times (r1 \oplus r2)$ |
| $\{(r1 \oplus (r2+r3))\} + \{(r2 \oplus (r1+r3))\} + \{(r3 \oplus (r1+r2))\}$ |

Fig.13

| 611 CONDITION OCCURRENCE DATE AND TIME | 612 SENSOR IDENTIFIER | 613 UTILIZATION ADVISABILITY STATE | 619 SENSOR UTILIZATION ADVISABILITY STATE |
|---|---|---|---|
| 2009/11/07 13:24:05 | GPS | 1 | |
| 2009/11/07 13:25:05 | GPS | 1 | |
| 2009/11/07 13:26:05 | GPS | 0 | |
| 2009/11/07 13:30:29 | Motion sensor | 0 | |
| 2009/11/07 13:31:29 | Motion sensor | 1 | |
| 2009/11/07 13:32:29 | Motion sensor | 1 | |
| 2009/11/07 13:33:29 | Motion sensor | 0 | |

Fig.14

740 CONDITION LIST

| 741 CONDITION CONTENTS | 742 PRIORITY 749 CONDITION |
|---|---|
| TRAVELLING BY CAR | 0 |
| HUNGRY | 0 |
| WITH MY FRIEND | 1 |
| DAYTIME | 0 |
| MIDNIGHT | 0 |

Fig.15

| 771 CONDITION CONTENTS | 772 SENSOR IDENTIFIER | 779 COMBINATION REQUIREMENT |
| --- | --- | --- |
| TRAVELLING BY CAR | GPS, Camera sensor | |
| HUNGRY | Motion sensor | |
| WITH MY FRIEND | Camera sensor | |

INFORMATION PROCESSING APPARATUS, INFORMATION PROCESSING SYSTEM, AND JUDGMENT RULE CONTROL METHOD

CROSS REFERENCE TO RELATED APPLICATIONS

This application is a National Stage of International Application No. PCT/JP2011/055850 filed Mar. 7, 2011, claiming priority based on Japanese Patent Application No. 2010-053176 filed Mar. 10, 2010, the contents of all of which are incorporated herein by reference in their entirety.

TECHNICAL FIELD

The present invention relates to an information processing apparatus, an information processing system and a judgment rule control method, in particular an information processing apparatus, an information processing system and a judgment rule control method, which deal with a judgment rule for defining a judgment method of condition group materialization.

BACKGROUND ART

In recent years, a reminding function to send information from an information processing apparatus to a user on the basis of a push system gathers attention. If information is registered in an application program with the reminding function, a user can receive the information by the push system. An example of the application program with the reminding function is a scheduler application. If a schedule in which data and time is associated with a comment is registered, the scheduler application displays the corresponding comment on the information processing apparatus, for example, several hours before the registered data and time.

In some technologies, not only date and time, but various conditions can be set as timing on when the information are presented.

An information delivery system described in Patent Document 1 relates to an information delivery system for increasing an opportunity to deliver information to a mobile information terminal connecting to an internet or a mobile communication network. The information delivery system determines timing on when the delivered information is outputted, on the basis of output condition information. The information delivery system may increase the opportunity to deliver information to the mobile information terminal.

An apparatus for handling information with conditions described in Patent Document 2 adds conditions in which information resources becomes useful, as condition information represented by 5W1H (Who, What, When, Where, Why, How), to the information resources and preliminarily stores them in advance. The apparatus for handling the information with conditions may select the information resources having the condition information suitable for the conditions of the moment and present them to a user.

[Patent Document]
[Patent Document 1] Japanese Patent Application Laid-Open No. 2006-309616
[Patent Document 2] International Patent Application Publication No. WO2004/019225

SUMMARY OF THE INVENTION

Problem to be Solved by the Invention

Technologies described in the above related technical documents require a specialized knowledge in order to appropriately define a judgment method for determining timing on when information is presented. Further, setup works of defining the judgment method take a lot of troubles.

Contents of the problems above described are explained in detail.

In the reminding function, it is necessary to preliminarily set a plurality of conditions in order to control timing on when information is presented and to constantly check whether or not the conditions are established, in order to present information at an appropriate timing. Therefore, the judgment method for establishing a condition group has to be defined and a judgment rule to be stored has to be properly set. If the conditions which frequently occur are mainly selected and set in the judgment rule, establishment of the condition group, i.e. presentation of reminding information frequently occurs. That is, information presentation occurs at an inappropriate timing, and information presentation does not occur at the appropriate timing. On the other hands, if unlikely conditions are mainly set in the judgment rule, establishment of the condition group, i.e. presentation of reminding information does not occur substantially. In this case, information cannot be presented at the appropriate timing.

In order to properly set the judgment rule in detail, knowhow and knowledge for the setting are required. An expert can set the judgment rule without any troubles. A user using an information processing apparatus, like a mobile phone, i.e. an ordinary user may lack the knowhow and the knowledge of setting the judgment rule. It is not realistic for an ordinary user to set the judgment rule under present circumstances.

Even though an expert or a user having the special knowledge sets the judgment rule, works of inputting the judgment rule one by one take a lot of troubles. The works of inputting the judgment rule are time-consuming for an expert and a user.

The technologies described in Patent Document 1 and Patent Document 2 enable to set the conditions of the timing on when information is presented. However, a user has to set the conditions by oneself. When using the technologies, an ordinary user has to learn the knowhow and the knowledge for setting the conditions in advance. The user is not necessarily able to set appropriate the conditions even though the user learns the knowhow and the knowledge.

An ordinary user needs the knowledge of setting the conditions of reminding and the knowhow of the setting in order to use existing reminding function, and the setup works take lots of troubles. It is difficult for a user lacking the knowledge and the knowhow to appropriately set the setting rule, the user cannot fully enjoy advantage of the reminding function.

An object of the invention is to provide an information processing apparatus, an information processing system and an judgment rule control method to solve the above problem.

Means for Solving a Problem

A first information processing apparatus of the invention includes an judgment rule candidate generating unit which generates a judgment rule candidate that is a combination of a plurality of conditions combined on the basis of a rule given in advance; a materialization-estimate calculation unit which calculates a judgment rule materialization estimate value indicating a materialization frequency estimate for each of said judgment rule candidates, on the basis of a sensor availability rate indicating an availability rate of a sensor within a prescribed period of time; and a judgment rule selection unit which selects a judgment rule from among the judgment rule candidates, on the basis of said judgment rule materialization estimate value and a notification amount indicating a desired notification frequency of information.

A second information processing apparatus of the invention includes judgment rule candidate generating means for generating judgment rule candidates that is a combination of a plurality of conditions combined on the basis of a rule given in advance; materialization-estimate calculation means for calculating a judgment rule materialization estimate value indicating a materialization frequency estimate for each of said judgment rule candidates, on the basis of a sensor availability rate given in advance indicating an availability rate of a sensor within a prescribed period of time; and judgment rule selection means for selecting a judgment rule from among the judgment rule candidates, on the basis of said judgment rule materialization estimate value and a predetermined notification amount indicating a desired notification frequency of information.

A first information processing system of the invention includes at least one first external apparatus including a sensor unit, and the information processing apparatus of the invention further including a communication unit which communicates with the sensor unit.

A second information processing system of the invention includes at least one second external apparatus including a storage apparatus for storing a combination requirement, and the information processing apparatus of the invention further including a communication unit which communicates with the storage apparatus.

A third information processing system of the invention includes at least one third external apparatus including a display for displaying the judgment rule, and the information processing apparatus of the invention further including a communication unit which communicates with the display.

An judgment rule control method in an information processing apparatus of the invention includes, with respect to a plurality of conditions inputted from a condition input unit, generating a combination of said conditions as a judgment rule candidate on the basis of a rule given in advance; calculating a judgment rule materialization estimate value indicating a materialization frequency estimate for each of said judgment rule candidates on the basis of a sensor availability rate indicating an availability rate of a sensor within a prescribed period of time, the sensor availability rate being stored in a sensor data storage unit; and selecting a judgment rule from among said judgment rule candidates on the basis of said calculated judgment rule materialization estimate value and a notification amount indicating a desired notification frequency of information, the notification amount being stored in a selection method storage unit.

A non-transitory computer-readable recording program recorded in a medium of the invention causes a computer to execute a process of generating a combination of conditions as a judgment rule candidate on the basis of a rule given in advance, with respect to a plurality of said conditions inputted from a condition input unit; a process of calculating an judgment rule materialization estimate value indicating a materialization frequency estimate for each of said judgment rule candidates on the basis of a sensor availability rate indicating an availability rate of a sensor within a prescribed period of time, the sensor availability rate being stored in a sensor data storage unit; and a process of selecting a judgment rule from among said judgment rule candidates on the basis of said judgment rule materialization estimate value and a notification amount indicating a desired notification frequency of information, the notification amount being stored in a selection method storage unit.

Effect of the Invention

In the invention, when the judgment method for determining timing on when information is presented is defined, the appropriate judgment rule is defined without the specialized knowledge and troublesome setup works.

BRIEF DESCRIPTION OF THE DRAWINGS

FIG. 2 is a diagram illustrating, a configuration and an example of conditions and a condition list of the first exemplary embodiment of the invention, FIG. 3 is a diagram illustrating an example of condition numbers of exemplary embodiments 1 to 5 of the invention, FIG. 4 is a diagram illustrating an example of judgment rule candidates of exemplary embodiments 1 to 5 of the invention, FIG. 5 is a diagram illustrating an example of judgment rule candidates of exemplary embodiments 1 to 5 of the invention, FIG. 6 is a diagram illustrating a configuration and an example of sensor availability rates of exemplary embodiments 1 to 5 of the invention, FIG. 7 is a diagram illustrating a configuration and an example of a combination requirement of the exemplary embodiment 1 of the invention, FIG. 8 is a diagram illustrating an example of judgment rule materialization estimate values of exemplary embodiments 1 to 5 of the invention, FIG. 9 is a diagram illustrating a configuration and an example of a notification information list and notification amount information of exemplary embodiments 1 to 5 of the invention, FIG. 11 is a diagram illustrating an example of judgment candidates of exemplary embodiments 1 to 5 of the invention, FIG. 13 is a diagram illustrating a configuration and an example of a sensor utilization advisability state of exemplary embodiments 2 to 5 of the invention, FIG. 14 is a diagram illustrating, a configuration and an example of conditions and a condition list of exemplary embodiments 2 to 5 of the invention, FIG. 15 is a diagram illustrating a configuration and an example of a combination requirement of exemplary embodiments 2 to 5 of the invention.

EXEMPLARY EMBODIMENTS FOR CARRYING OUT OF THE INVENTION

An exemplary embodiment of the invention is described in detail with reference to drawings.

First Exemplary Embodiment

Figure 1:
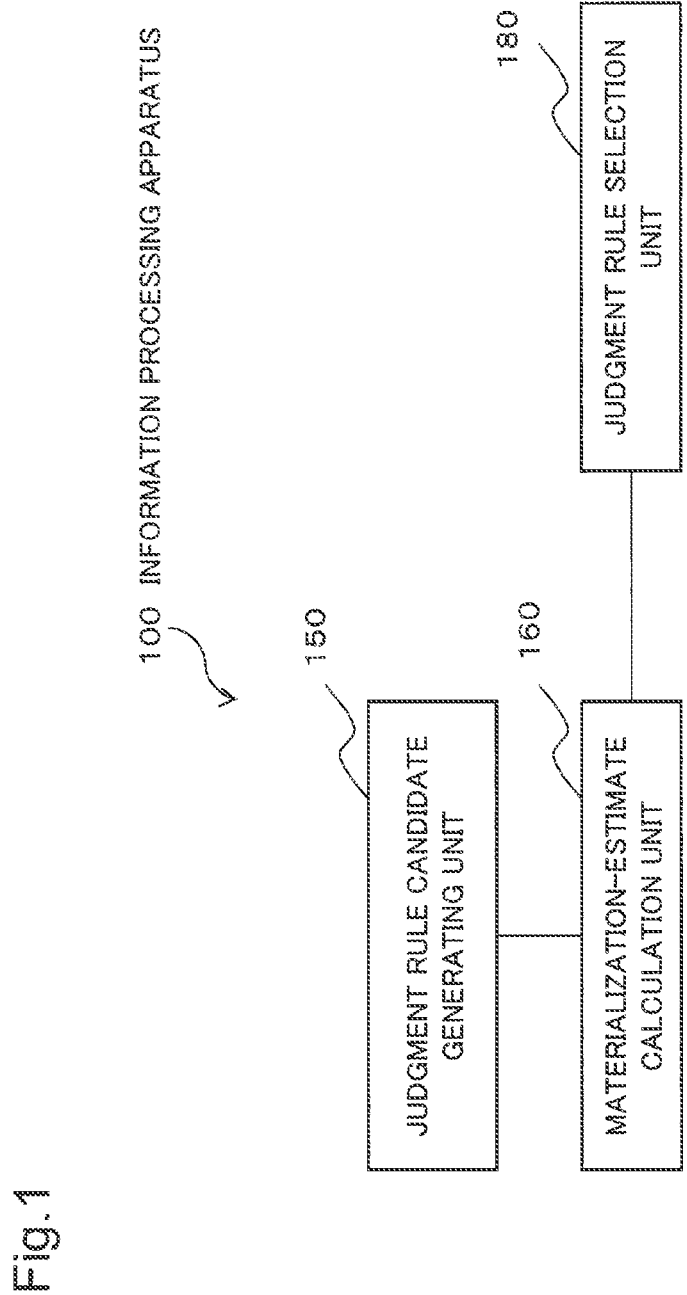
FIG. 1 is a block diagram illustrating a configuration of a first exemplary embodiment of the invention.

FIG. 1 is a block diagram illustrating a configuration of a first exemplary embodiment of the invention.

Referring FIG. 1, an information processing apparatus 100 of the first exemplary embodiment of the invention includes a judgment rule candidate generating unit 150, a materialization-estimate calculation unit 160, and a judgment rule selection unit 180.

The information processing apparatus 100 is, for example, a mobile phone terminal, a PHS (Personal Handy phone System), a PDA (Personal Data Assistant), a car navigation system or a PC (Personal Computer).

With respect to predetermined conditions 649 included in a condition list 640 as shown in FIG. 2, the judgment rule candidate generating unit 150 generates combination of the one or more conditions 649 as a judgment rule candidate on the basis of a rule given in advance. For example, the judgment rule candidate generating unit 150 adds a condition number 652 to condition contents 651 as shown in FIG. 3. For example, a condition number r1 corresponds to the condition contents "travelling by car", a condition number r2 corresponds to the condition contents "hungry", and a condition number r3 corresponds to the condition contents "with my friend". The judgment rule candidate generating unit 150 generates and outputs information of a judgment rule candidate 653 represented by a calculation formula using the condition numbers 652, as shown in FIG. 4.

The judgment rule candidate generating unit 150 may output a judgment rule candidate 654 represented on the rule basis, as shown in FIG. 5.

The materialization-estimate calculation unit 160 calculates a judgment rule materialization estimate value 655 indicating a predicted value of frequency of materialization of the judgment rule candidate 653, i.e. frequency of being true of the judgment rule candidate 653, with respect to each of the judgment rule candidate 653 generated by the judgment rule candidate generating unit 150. The materialization-estimate calculation unit 160 outputs the calculated judgment rule materialization estimate value 655. The judgment rule materialization estimate value 655 is calculated on the basis of the judgment rule candidate 653 as shown in FIG. 8.

Specifically, the materialization-estimate calculation unit 160 calculates on the basis of the judgment rule candidate 653 with reference to a sensor availability rate 639 given in advance shown in FIG. 6 and a predetermined combination requirement 679, as shown in FIG. 7, designating a sensor required for judgment of materialization of the condition 649.

As shown in FIG. 6, the sensor availability rate 639 includes a sensor identifier 631 and an availability rate 632. The availability rate 632 is a rate of a period of time for which a sensor is available in a constant period of time. The length of the constant period of time may be fixed in a system or set by a user. The set constant period of time may be, for example, "last one week", "last one month", or "all histories".

As shown in FIG. 7, the combination requirement 679 is information in which condition contents 671 (same as the condition contents 651 of FIG. 3) is associated with a sensor identifier 672.

For example, the materialization-estimate calculation unit 160 calculates the judgment rule materialization estimate value 655, "0.008" of the judgment rule candidate 653, "r1× r2×r3", as follows.

The materialization-estimate calculation unit 160 obtains the sensor identifier 672, "GPS" of the condition contents 671, "travelling by car" corresponding to the condition number 652, "r1", on the basis of the combination requirement 679 of FIG. 7. Next, the materialization-estimate calculation unit 160 obtains the availability rate 632 of "1.00" corresponding to the sensor identifier 631 (=sensor identifier 672), "GPS", i.e. corresponding to the condition number 652, "r1", on the basis of the sensor availability rate of FIG. 6.

The materialization-estimate calculation unit 160 also obtains the availability rates 632, "0.04" and "0.20" corresponding to the condition numbers 652, "r2" and "r3", respectively. Next, the materialization-estimate calculation unit 160 calculates the obtained availability rate 632 based on the judgment rule candidate 653 (1.00×0.04×0.20), and calculates the judgment rule materialization estimate value 655 of "0.008".

The judgment rule selection unit 180 selects a judgment rule from among the judgment rule candidates 653 so that timing on when information is presented occurs at an appropriate frequency, on the basis of the judgment rule materialization estimate value 655 and a notification amount information list 690, which is preliminarily stored, as shown in FIG. 9. Next, the judgment rule selection unit 180 outputs information indicating the selected judgment rule. As shown in FIG. 9, the notification amount information list 690 includes at least one piece of notification amount information 699 composed of a notification amount 691, an upper limit 692, a lower limit 693, and an average value 694. The upper limit 692 and the lower limit 693 are the judgment rule materialization estimate upper and lower limits, which satisfy the notification amount 691, and which are calculated in advance. The average value 694 is an average of the upper limit 692 and the lower limit 693. The notification amount 691 to be selected from the notification amount information list 690 may be inputted by a user using means not shown, or described in notification contents not shown.

Figure 10:
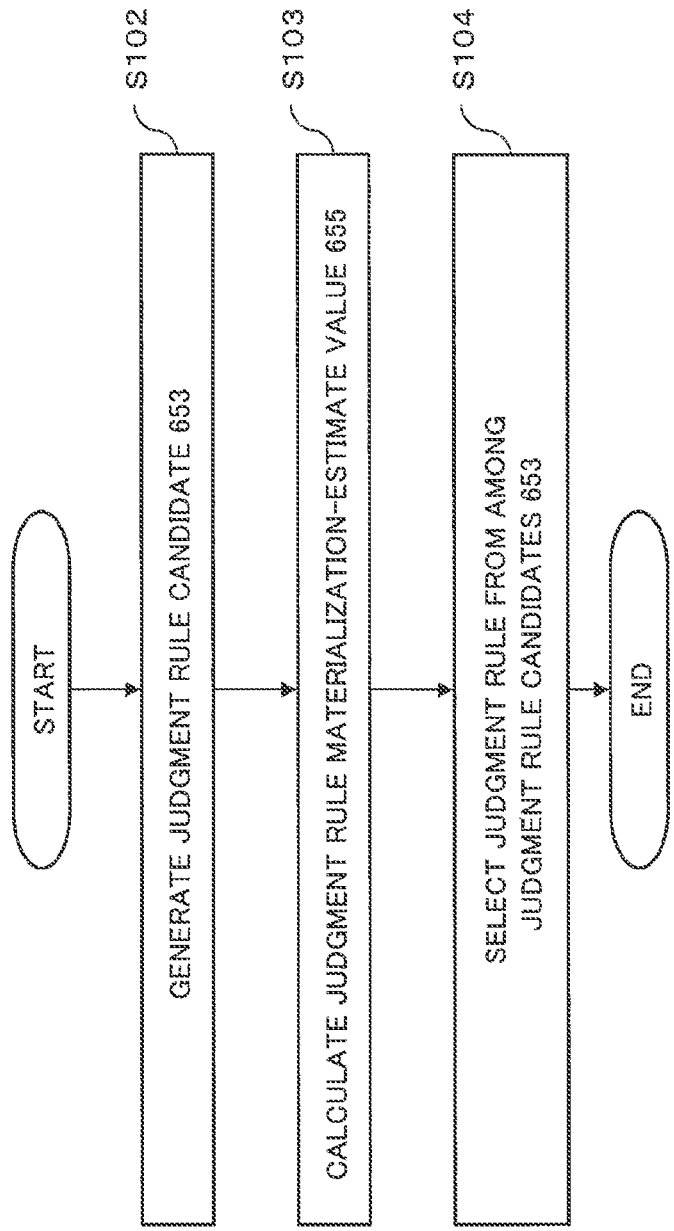
FIG. 10 is a flowchart illustrating an operation of a first exemplary embodiment of the invention.

Operations of the exemplary embodiment are explained in detail using FIG. 10.

With respect to the conditions 649 included in the condition list 640, the judgment rule candidate generating unit 150 generates a combination of one or more conditions 649, as the judgment rule candidates 653, on the basis of a rule given in advance. Next, the judgment rule candidate generating unit 150 outputs information indicating the generated judgment rule candidates 653 (step S102).

One example of generating steps of generating the judgment rule candidates 653 on the basis of a rule given in advance is described below using a pseudo-code which is a structured programming descriptive method. In the following example, formulas are generated as the judgment rule candidates 653. The generated formulas are illustrated as the judgment rule candidates 653 in FIG. 4.

1: start
2: variable i=1 is set
3: {

1': generate all of combinations of selecting i pieces from among the received conditions 649, 2': with respect to each of the combinations, linking selected i pieces of the conditions 649 each other by additions and put them in parentheses, 3': with respect to each of the combinations, linking (the number of pieces of the conditions 649—i) pieces of the conditions 649 each other by multiplications, which are not selected in 2', and linking them and the above parentheses by multiplications, 4': regard each of the combinations as one calculation formula,
}
4: add 1 to i
5: return to 3, if i is equal to or smaller than (the number of pieces of the conditions 649)
6: delete overlapping calculation formulas
7: end In the example above, the calculation formulas only using addition and AND are generated. Addition, multiplication, EXOR (exclusive OR), and NOT may be optionally combined. The calculation formulas including EXOR are, for example, illustrated as judgment rule candidates 653A in FIG. 11.

Next, the materialization-estimate calculation unit 160 receives information on the judgment rule candidates 653 outputted from the judgment rule candidate generating unit 150. The materialization-estimate calculation unit 160 calculates the judgment rule materialization estimate value 655 indicating the frequency of materialization of each of the judgment rule candidates 653 on the basis of the received information (step S103).

The judgment rule selection unit 180 refers to the judgment rule materialization estimate value 655 and notification amount information 699 as shown in FIG. 9 on the basis of the notification amount 691, and selects the judgment rule from among the judgment rule candidates 653 so that timing on when information is presented occurs at the appropriate frequency. Next, the judgment rule selection unit 180 outputs the selected judgment rule (step S104).

An example of selection of the judgment rule, which the judgment rule selection unit 180 performs, specifically described.

The judgment rule selection unit 180 compares the judgment rule materialization estimate value 655 of each of the judgment rule candidates 653 with the upper limit 692 and the lower limit 693 in the notification amount information 699 corresponding to the selected notification amount 691. The judgment rule candidates 653 of which the judgment rule materialization estimate value 655 is inside of a range between the upper limit 692 and the lower limit 693 are selected as the judgment rule.

Effects of the exemplary embodiment described above is that a specialized knowledge is unnecessary, setup works takes no trouble, and an appropriate judgment rule can be defined, when the judgment method for deciding timing on when information is presented is defined.

That is because following performances are carried out. Initially, the judgment rule candidate generating unit 150 generates the judgment rule candidates 653. Next the materialization-estimate calculation unit 160 calculates the judgment rule materialization estimate value 655 of the judgment rule candidates 653. Next the judgment rule selection unit 180 selects the judgment rule on the basis of the judgment rule materialization estimate value 655 and the notification amount information list 690.

Second Exemplary Embodiment

Next, a second exemplary embodiment of the invention is described in detail with reference to drawings.

Figure 12:
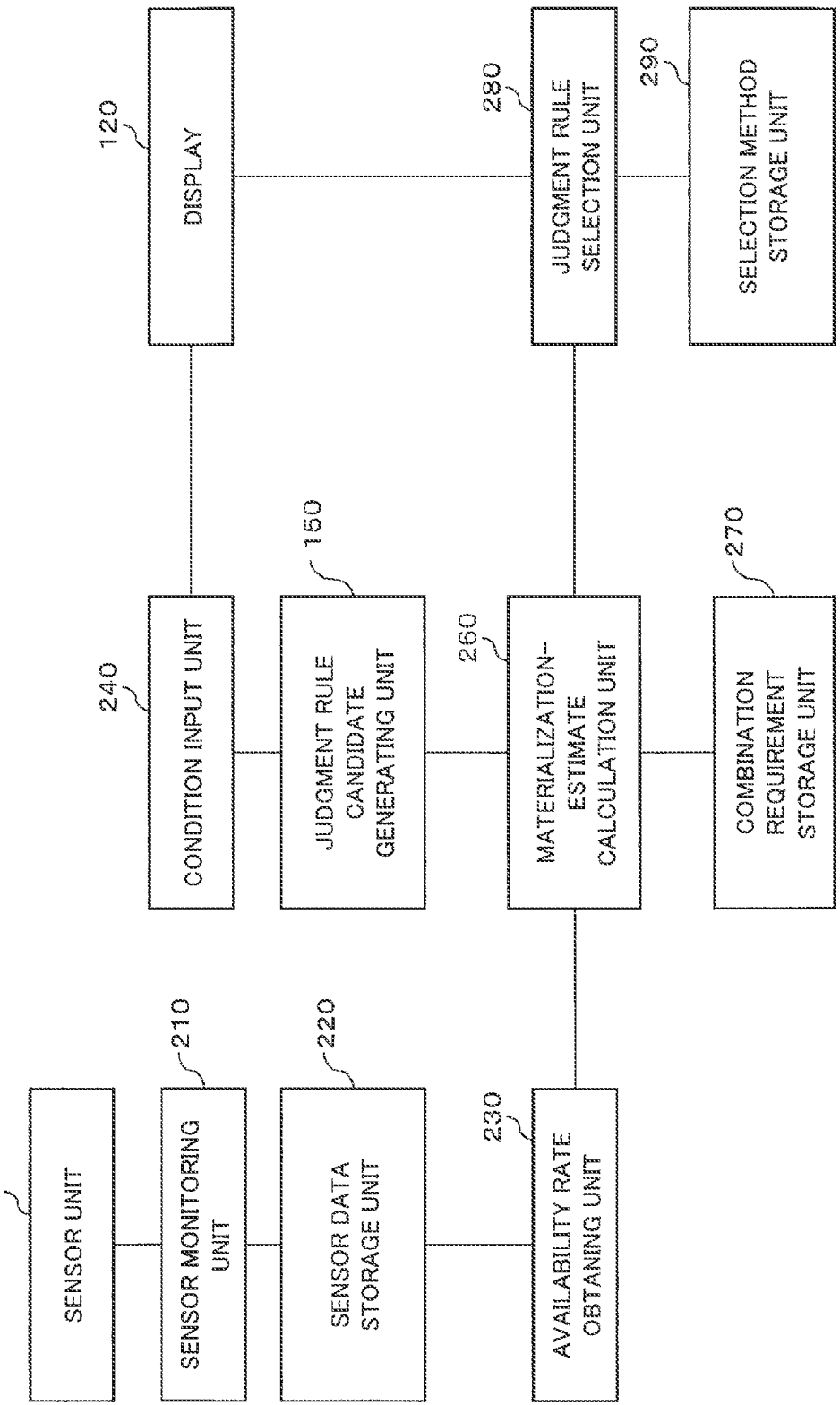
FIG. 12 is a block diagram illustrating a configuration of a second exemplary embodiment of the invention.

FIG. 12 is a block diagram illustrating a configuration of a second exemplary embodiment of the invention. Referring to FIG. 12, an information processing apparatus 200 of the second exemplary embodiment of the invention includes a display 120, a sensor unit 140, the judgment rule candidate generating unit 150, the materialization-estimate calculation unit 160 and the judgment rule selection unit 180. The information processing apparatus 200 further includes a sensor monitoring unit 210, a sensor data storage unit 220, an availability rate obtaining unit 230, a condition input unit 240, a combination requirement storage unit 270, and a selection method storage unit 290.

The sensor unit 140 includes at least one sensor (not shown). The sensor is, for example, operation detecting means of a button (not shown) included in the information processing apparatus 200, a GPS (Global Positioning System) sensor, or an acceleration sensor.

The sensor monitoring unit 210 stores sensor data obtained by the sensor unit 140 in the sensor data storage unit 220.

Additionally, the sensor monitoring unit 210 continuously monitors a utilization advisability state of each sensor in the sensor unit 140. Then the sensor monitoring unit 210 stores a utilization advisability state 613, state occurrence date and time 611, and a sensor identifier 612, in the sensor data storage unit 220, as a sensor utilization advisability state 619 as shown in FIG. 13. The utilization advisability state 613 is a state representing whether or not the sensor is correctly able to obtain a value. For example, if a power source of the GPS sensor is turned off, the sensor unit 140 is not able to obtain the value of the GPS sensor. At this time, the utilization advisability state 613 indicates "0". When the value is correctly obtained, the utilization advisability state 613 indicates "1".

The sensor data storage unit 220 stores the sensor utilization advisability state 619.

The availability rate obtaining unit 230 calculates the availability rate 639 of a sensor on the basis of contents of the sensor data storage unit 220.

The condition input unit 240 receives a condition list 740 including at least one condition 749 shown in FIG. 14 and the notification amount 691 shown in FIG. 9. The condition 749 is a combination of condition contents 741 and priority 742.

A user inputs a value of 1 or 0 as the priority 742. The priority 742 of 1 means that when the judgment rule is selected from the judgment rule candidates 653, the judgment rule candidate 653 in which the materialization of the corresponding condition 749 is an indispensable condition is the candidate of the selection. That is, the priority 742 of 1 means that the condition has the priority. The priority 742 of 0 means that when the judgment rule is selected from the judgment rule candidates 653, the judgment rule candidate 653 in which regardless of the materialization or non-materialization of the corresponding condition 749, any one of the judgment rule candidates 653 may be the candidate of the selection. That is, the priority 742 of 0 means that the condition has no priority.

When inputting the notification amount 691, a user selects the notification amount 691 from the information notification amount list in which for example "once a year", "once a half year", "once a month", and the like, are set.

Alternatively, the notification amount 691 may be set so as to vary depending on a materialization state of the condition 749. In this case, when the notification amount 691 is inputted, for example, a user selects a combination of the condition contents 741 and the notification amount 691 from the condition list 740 and the information notification amount list in which, "once a year", "once a half year", "once a month", and the like, are set. Specifically, a user may select, for example, the combination of "daytime" as the condition contents 741 and "once a month" as the notification amount 691, or the combination of "midnight" as the condition contents 741 and "once a half year" as the notification amount 691.

The judgment rule candidate generating unit 150 is the same as that of the first exemplary embodiment.

A materialization-estimate calculation unit 260 calculates the judgment rule materialization estimate value 655 with respect to each of the judgment rule candidates 653 generated by the judgment rule candidate generating unit 150. The judgment rule materialization estimate value 655 is calculated on the basis of the judgment rule candidates 653 by referring to the sensor availability rate 639, shown in FIG. 6, calculated by the availability rate obtaining unit 230 and a combination requirement 779 shown in FIG. 15. Also, the combination requirement 779, shown in FIG. 15, stored in the combination requirement storage unit 270 designates a combination of the sensors which is required for judgment of materialization of the condition 749. The combination of the sensors which is required for judgment of materialization of the condition 749 is, for example, a combination of the sensors indicated by "GPS, Camera sensor" as a sensor identifier 772 corresponding to "travelling by car" as condition contents 771. If both sensor data of GPS and sensor data of Camera sensor are true for "travelling by car", it is judged that "travelling by car" as the condition contents 771 is materialized.

The combination requirement storage unit 270 stores a combination requirement list 770 including at least one predetermined combination requirement 779.

A judgment rule selection unit 280 selects the judgment rule from among the judgment rule candidates 653, on the basis of the notification amount information list 690 stored in the selection method storage unit 290 and the judgment rule materialization estimate value 655 so that timing on when information is presented occurs at the appropriate frequency.

The selection method storage unit 290 stores the predetermined notification amount information list 690 as shown in FIG. 9.

The display 120 presents the judgment rule selected by the judgment rule selection unit 280 to a user.

Figure 16:
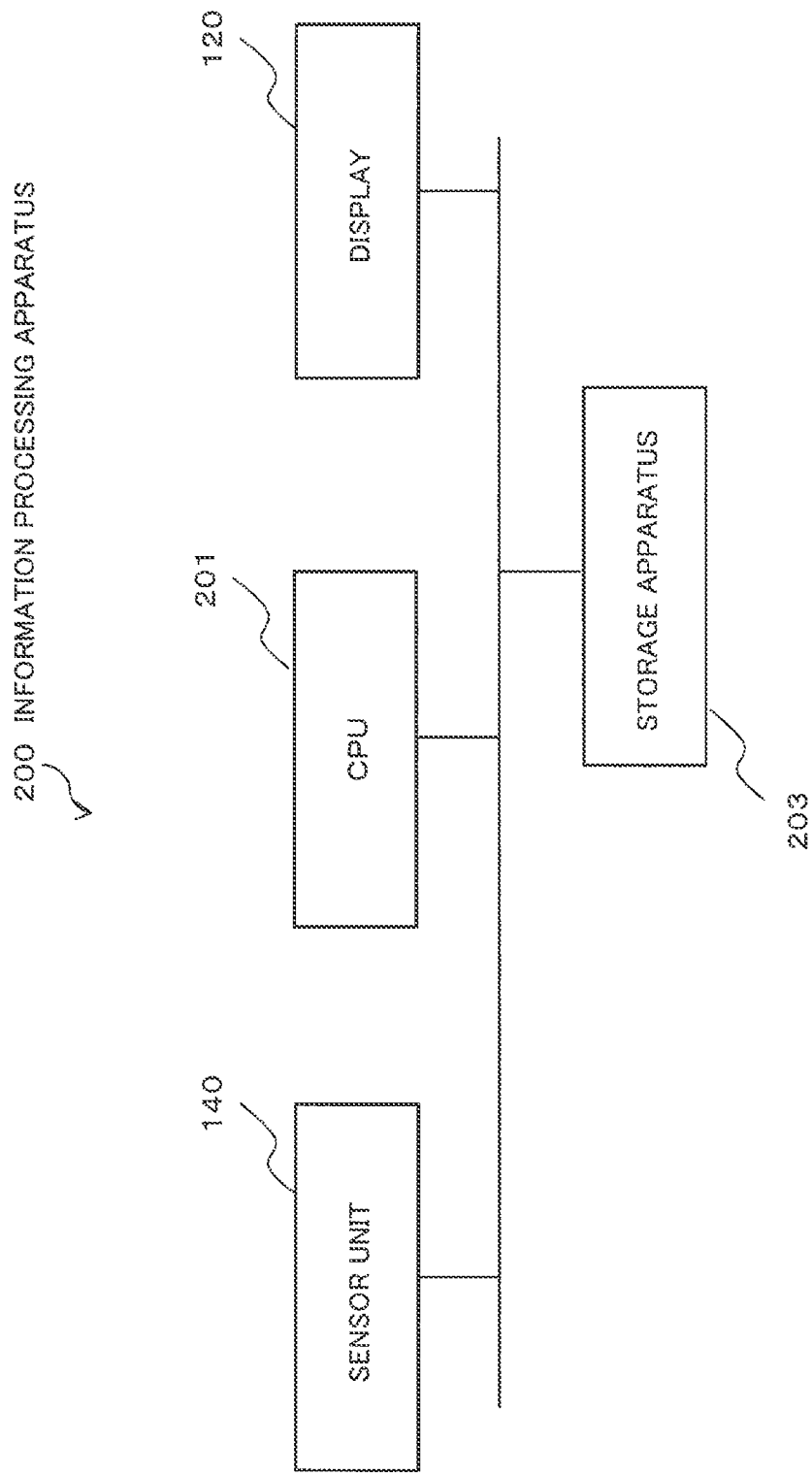
FIG. 16 is a block diagram illustrating a hardware configuration of the second exemplary embodiment of the invention.

FIG. 16 is a block diagram illustrating a hardware configuration of the exemplary embodiment.

Referring to FIG. 16, the information processing apparatus 200 of the second exemplary embodiment includes a CPU (Central Processing Unit) 201, the display 120, a storage apparatus 203, and the sensor unit 140.

The CPU 201 performs operations of the sensor monitoring unit 210, the availability rate obtaining unit 230, the condition input unit 240, the judgment rule candidate generating unit 150, the materialization-estimate calculation unit 260, and the judgment rule selection unit 280, on the basis of a program not shown The storage apparatus includes the sensor data storage unit 220, the combination requirement storage unit 270, and the selection method storage unit 290.

Figure 17:
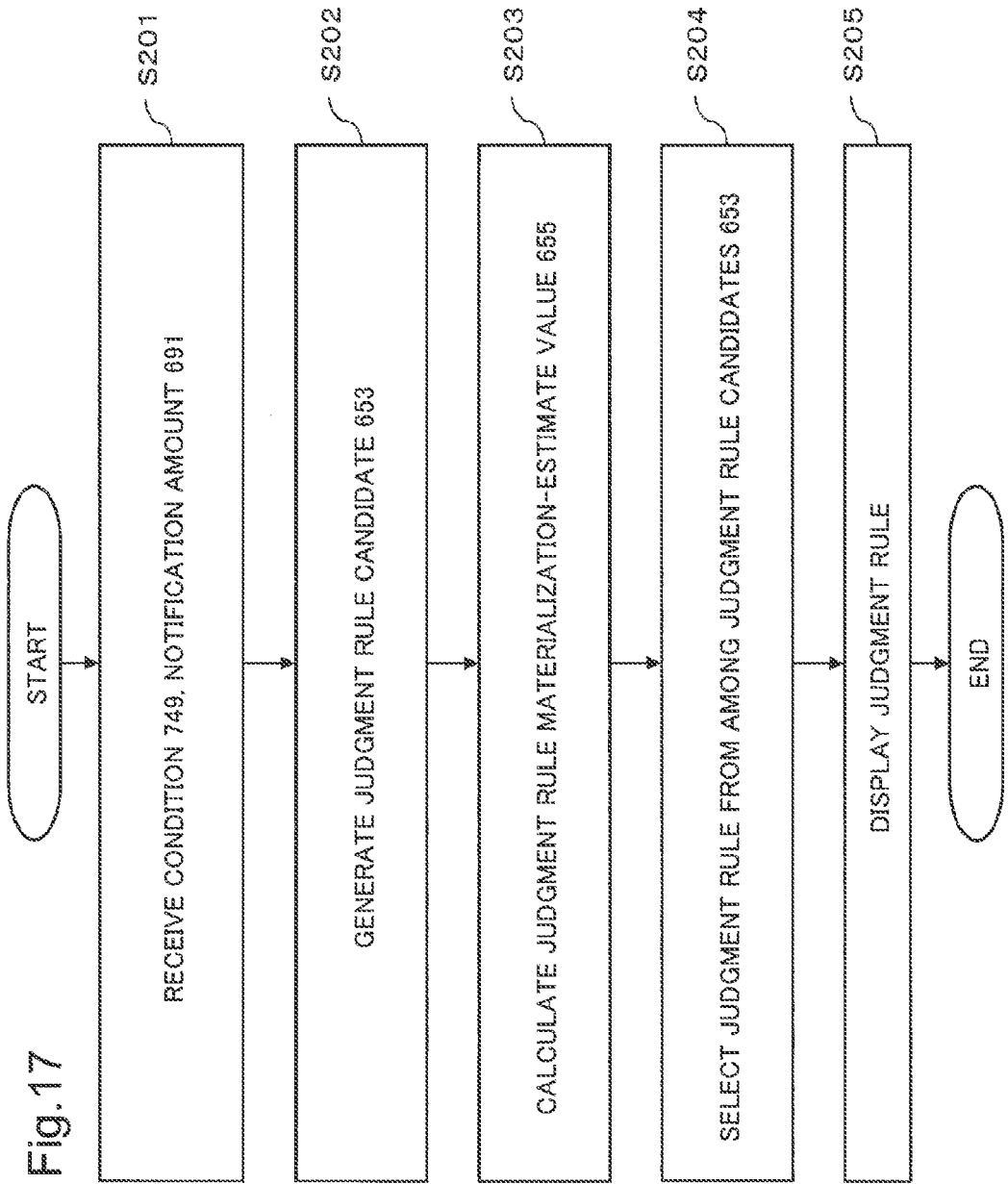
FIG. 17 is a flowchart illustrating an operation of exemplary embodiments 2 to 5 of the invention.

Next, operations of the exemplary embodiment are described in detail using FIG. 17.

The condition input unit 240 receives at least one condition 749 and the notification amount 691 (step S201).

The judgment rule candidate generating unit 150 generates a combination of one or more than one conditions 649, as the judgment rule candidates 653, from among the conditions 749 received by the condition input unit 240 (step S202).

The generation steps of the judgment rule are the same as those of the first exemplary embodiment.

The materialization-estimate calculation unit 260 calculates the judgment rule materialization estimate value 655 indicating frequency of materialization of each of the judgment rule candidates 653 generated by the judgment rule candidate generating unit 150 (step S203)

The judgment rule selection unit 280 refers to the notification amount information 699 as shown in FIG. 9 on the basis of the judgment rule materialization estimate value 655 and the notification amount 691, and selects the judgment rule from among the judgment rule candidates 653 so that timing on when information is presented occurs at the appropriate frequency (step S204).

The display 120 displays the judgment rule selected by the judgment rule selection unit 280 (step S205).

Figure 18:
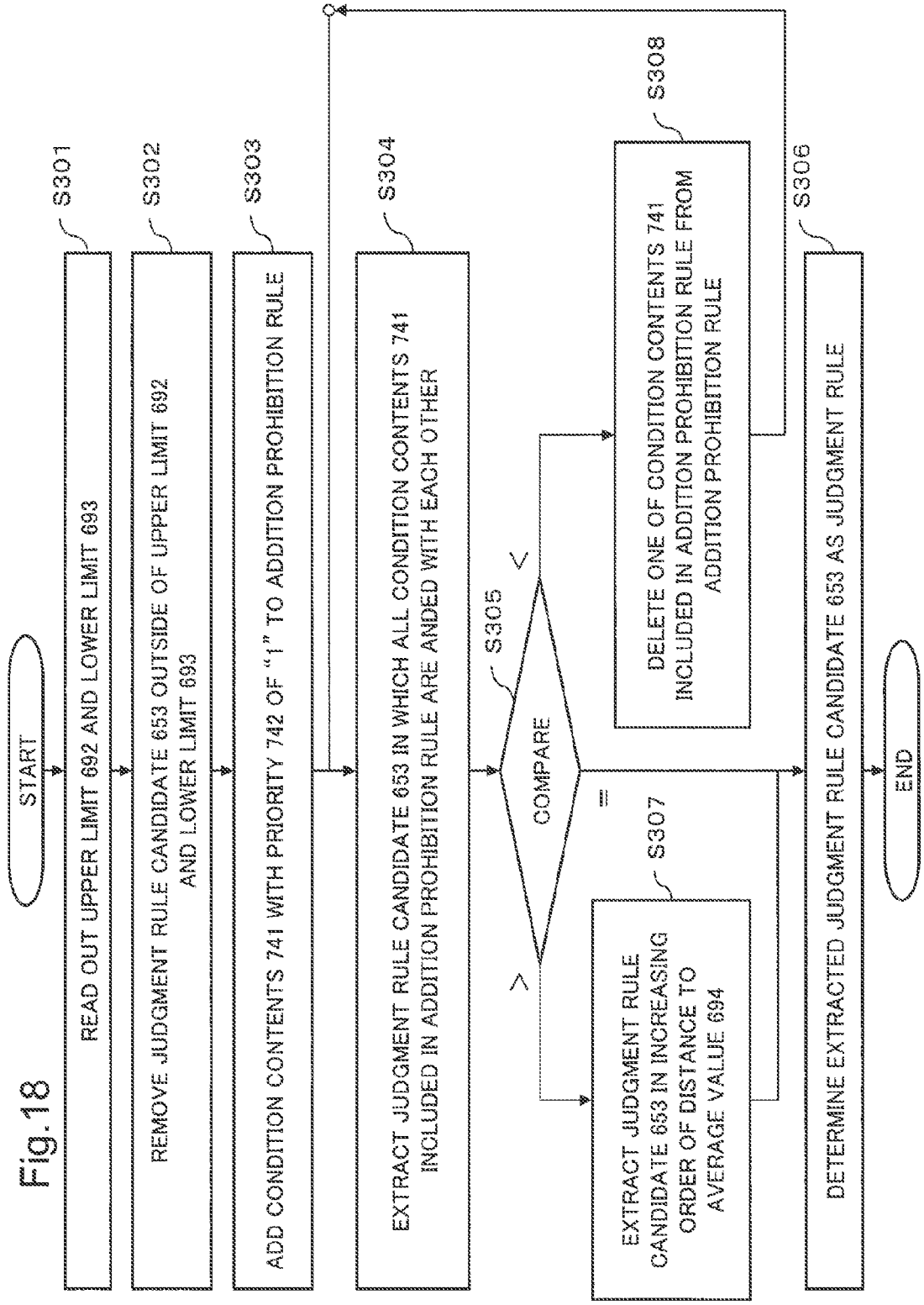
FIG. 18 is a flowchart illustrating an operation of exemplary embodiments 2 to 5 of the invention.

The selection of the judgment rule is explained in detail using FIG. 18. The case, in which a calculation formula is used as the judgment rule, is described.

The judgment rule selection unit 280 reads out a upper limit 692 and a lower limit 693 which are included in the notification amount information 699 corresponding to the notification amount 691 inputted by a user (step S301).

The judgment rule selection unit 280 compares the judgment rule materialization estimate value 655 of each of the judgment rule candidates 653 generated by the judgment rule candidate generating unit 150 with the upper limit 692 and the lower limit 693. Then the judgment rule selection unit 280 deletes the judgment rule candidates 653, the judgment rule materialization estimate value 655 of which exceeds the upper limit 692 and falls below the lower limit 693, from the selection target of the judgment rule (step S302).

Next, the judgment rule selection unit 280 adds the condition contents 741 of the condition 749 in which the priority 742 is set as "1" to an addition prohibition rule (S303).

Additions prohibition rule is stored in a storage means not shown by the judgment rule selection unit 280. Next, the judgment rule candidates 653, in which all of the condition numbers 652 corresponding to the condition contents 741 included in additions prohibition rule are linked with each other by multiplications, are extracted (step S304).

Next, the judgment rule selection unit 280 compares the number of the extracted judgment rule candidates 653 with a setting value (e.g. 10) given in advance (step S305). If the number of the extracted judgment rule candidates 653 accords with the setting value ("=" in step S305), the judgment rule selection unit 280 regards the extracted judgment rule candidates 653 as the selection result of the judgment rule selection unit 280 (step S306).

If the number of the extracted judgment rule candidates 653 is greater than the setting value (">" in step S305), the judgment rule selection unit 280 selects the judgment rule candidates 653 by the number of pieces corresponding to the setting value in order of increasing distance from an average value 694 to the judgment rule materialization estimate value 655 (step S307). The average value 694 is a value of ((upper limit 692+lower limit 693)/2). Alternatively, the judgment rule selection unit 280 may select the judgment rule candidates 653 by the number of pieces corresponding to the setting value so that an average of the judgment rule materialization estimate values 655 of the judgment rule candidates 653 in the selection result comes close to the average value 694.

If the number of the extracted judgment rule candidates 653 is smaller than the setting value ("<" in step S305), the judgment rule selection unit 280 further performs operations for re-extracting the judgment rule candidates 653 by the number of pieces corresponding to (the setting value−the number of the extracted the judgment rule candidates 653). In the re-extraction, the judgment rule selection unit 280 removes the condition contents 741, in which the availability rate 632 corresponding to the corresponding sensor identifier 672 in the condition contents 741 included in additions prohibition rule is the lowest, from additions prohibition rule (step S308). Next, step S304 is performed.

A first effect of the exemplary embodiment is to enable to preliminarily recognize frequency of information notification and to enable to easily set the judgment rule so that information is presented at the appropriate frequency, in addition to the effect of the first exemplary embodiment.

That is because the selected judgment rule is displayed in the display 120.

A second effect of the exemplary embodiment is to enable to eliminate the need for preliminary set of the availability rate 632.

That is because the sensor monitoring unit 210 monitors the utilization advisability state 613 of each sensor in the sensor unit 140, and the availability rate obtaining unit 230 refers to the utilization advisability state 613 and calculates the availability rate 632.

Third Exemplary Embodiment

A third exemplary embodiment of the invention is described in detail with reference to drawings.

Figure 19:
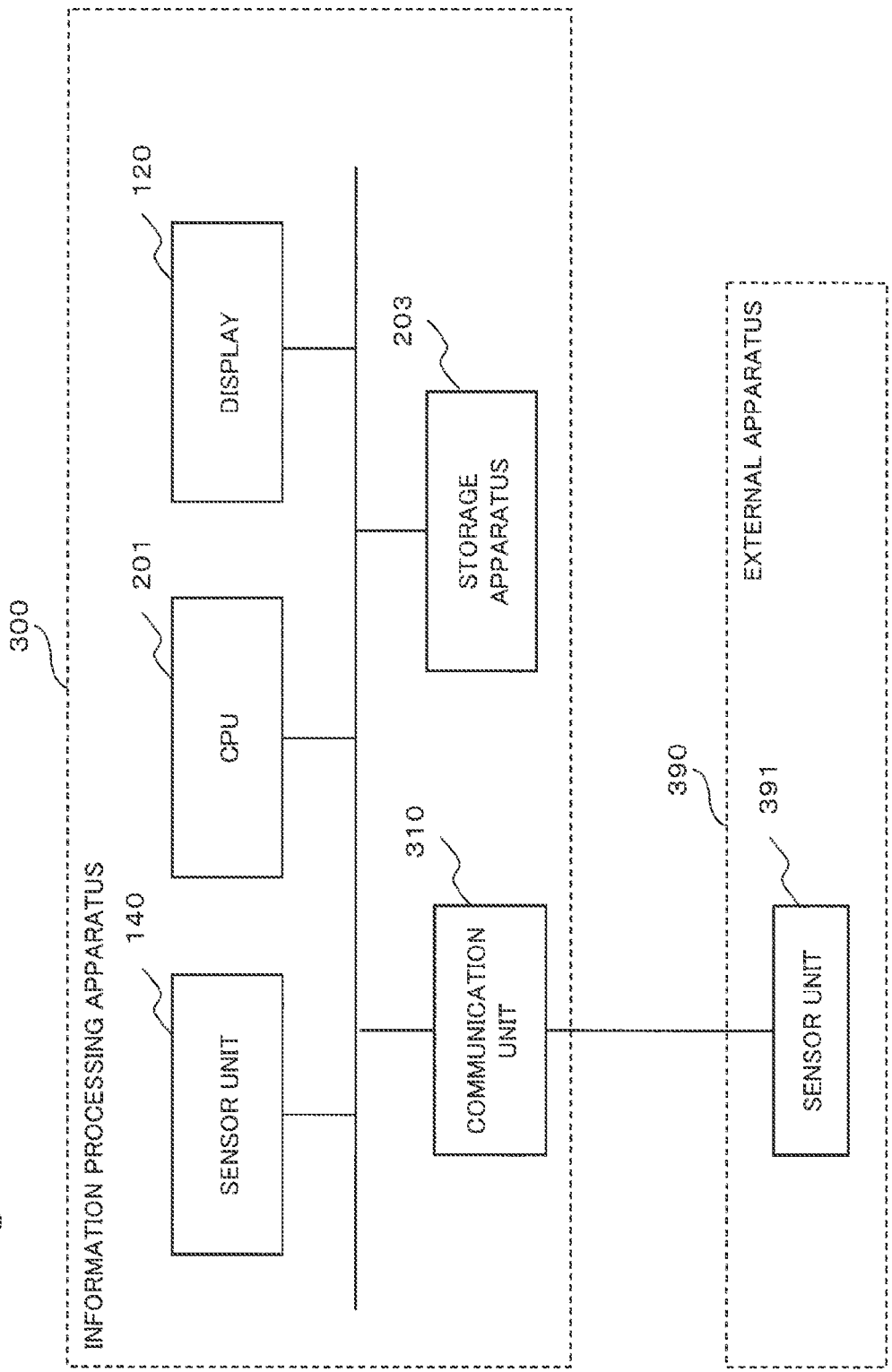
FIG. 19 is a block diagram illustrating a hardware configuration of a third exemplary embodiment of the invention.

FIG. 19 is a block diagram illustrating a hardware configuration of the third exemplary embodiment of the invention.

Referring to FIG. 19, the third exemplary embodiment is composed of an information processing apparatus 300 and an external apparatus group 390.

The external apparatus group 390 includes a sensor unit 391. The information processing apparatus 300 includes a communication unit 310.

The communication unit 310 receives data from a sensor not show which is included in the sensor unit 391 of the external apparatus group 390. The sensor is, for example, an infrared camera sensor, a motion sensor, or a sound sensor. The sensor unit 391 included in the external apparatus group 390 of the exemplary embodiment may be any apparatus which can communicate with the communication unit 310.

Figure 20:
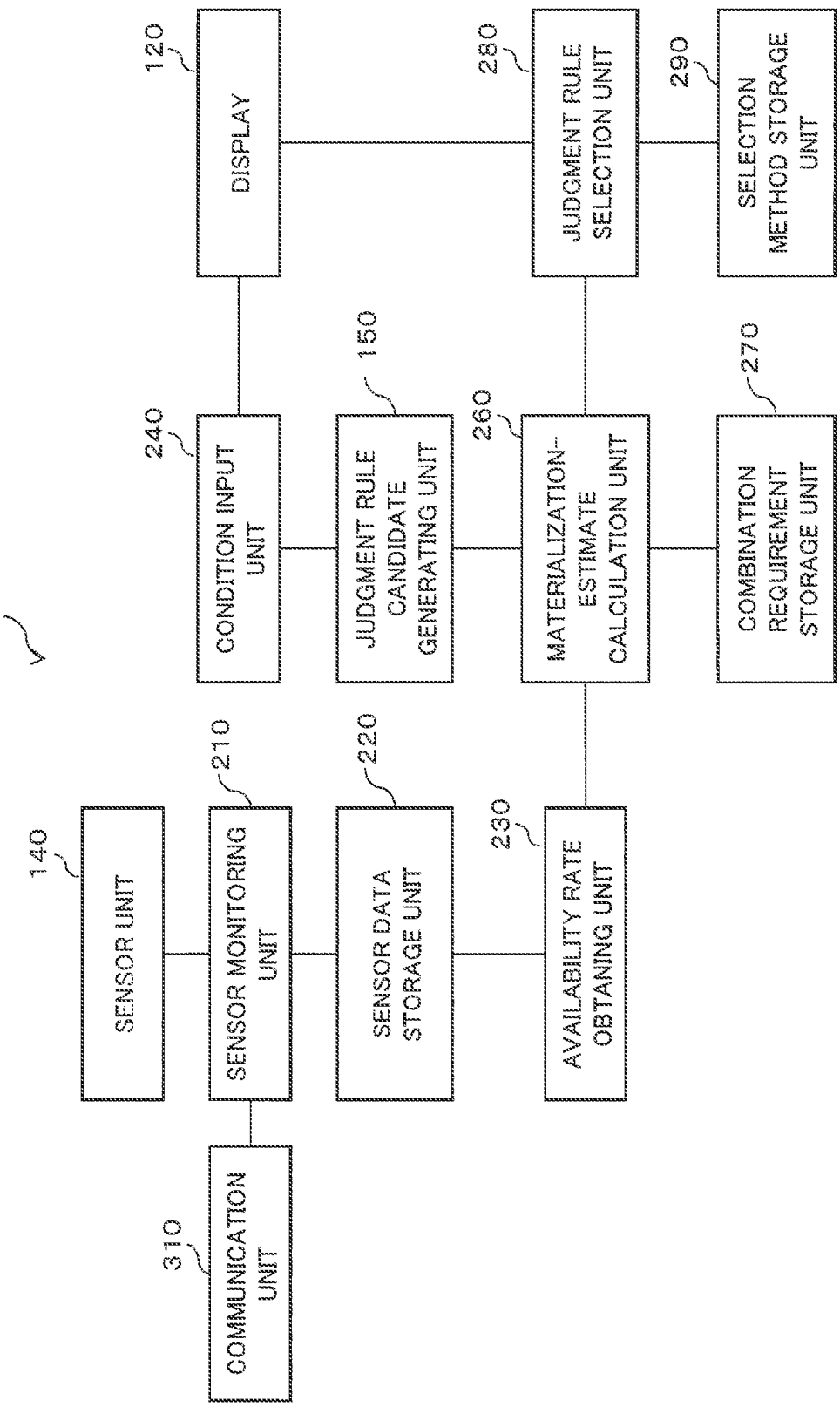
FIG. 20 is a block diagram illustrating a configuration of the third exemplary embodiment of the invention.

The information processing apparatus 300 of the invention is described in detail. FIG. 20 is a block diagram illustrating a configuration of the third exemplary embodiment of the invention.

Referring to FIG. 20, the information processing apparatus 300 of the exemplary embodiment further includes the communication unit 310, compared with the information processing apparatus 200 of the second exemplary embodiment shown in FIG. 16.

In the second exemplary embodiment, the sensor monitoring unit 210 receives data of each sensor from the sensor unit 140 indicating the sensor group in the information processing apparatus 200 and stores them in the sensor data storage unit 220. In the exemplary embodiment, the sensor monitoring unit 210 obtains data of each sensor received from the sensor unit 391 of the external apparatus group 390 by the communication unit 310 and stores them in the sensor data storage unit 220.

In the second exemplary embodiment, the sensor monitoring unit 210 monitors a utilization advisability state of each sensor of the sensor unit 304 in the information processing unit 200 and stores it in the sensor data storage unit 220 as the utilization advisability state 613. In the exemplary embodiment, the sensor monitoring unit 210 monitors a utilization advisability state of each sensor of the sensor unit 391 of the external apparatus group 390 through the communication unit 310, and stores it in the sensor data storage unit 220 as the utilization advisability state 613.

An effect of the exemplary embodiment is to enable to define the judgment rule for achieving timing of information notification with high accuracy without troublesome setup works, in addition to the effect of the second exemplary embodiment.

That is because the sensor unit 391 included in the external apparatus group, not included in the information processing apparatus 300 is employed through the communication unit 310.

Fourth Exemplary Embodiment

A fourth exemplary embodiment of the invention is described in detail with reference to drawings.

Figure 21:
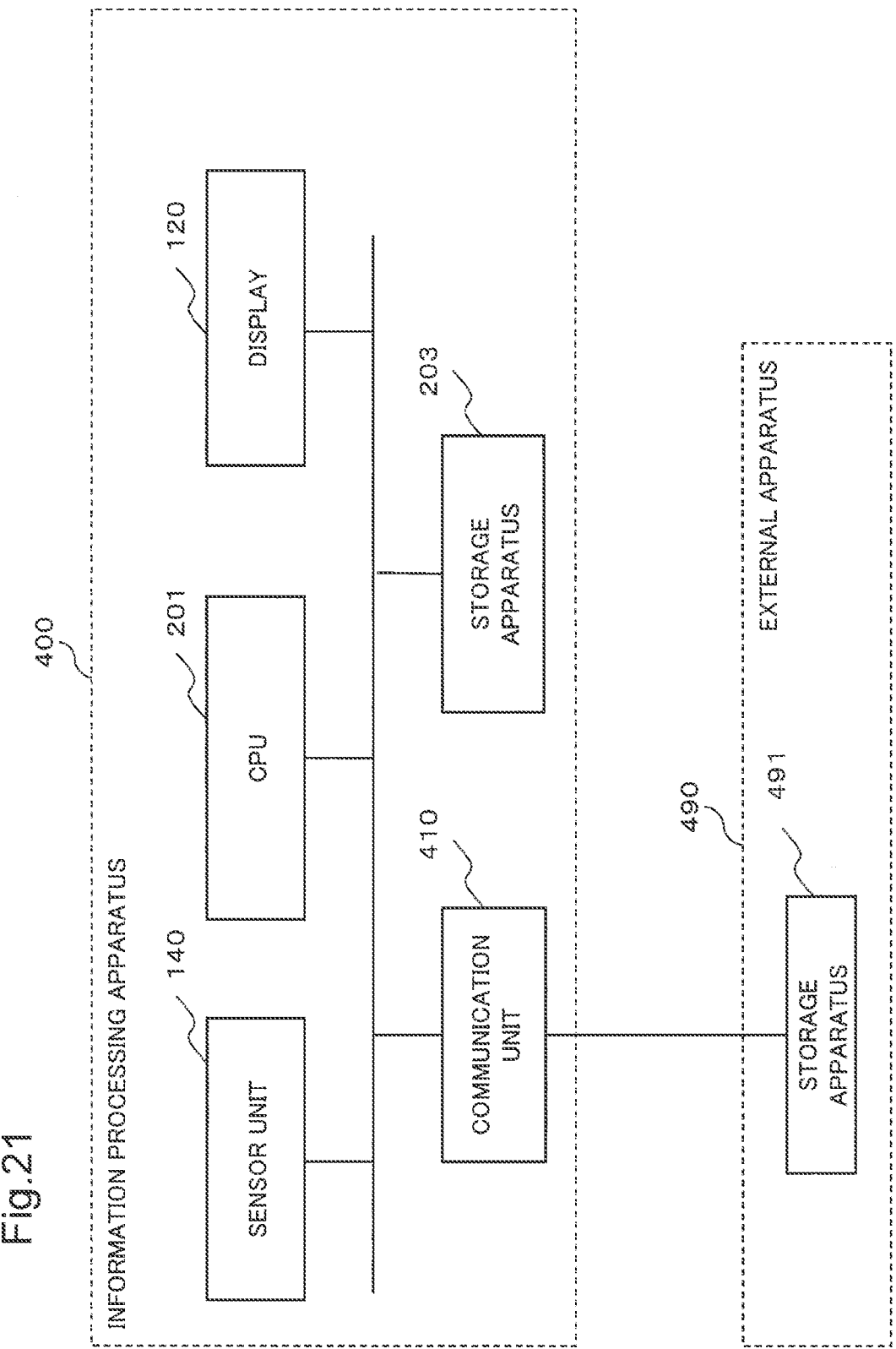
FIG. 21 is a block diagram illustrating a hardware configuration of a fourth exemplary embodiment of the invention.

FIG. 21 is a block diagram illustrating a hardware configuration of the fourth exemplary embodiment of the invention.

Referring to FIG. 21, the fourth exemplary embodiment is composed of an information processing apparatus 400 and an external apparatus 490.

The external apparatus 490 includes a storage apparatus 491. The information processing apparatus 400 further includes a communication unit 410.

The communication unit 410 receives a combination requirement 779 which is not stored in the storage apparatus 203 from the storage apparatus 491 of the external apparatus 490. The storage apparatus 491 of the external apparatus 490 of the exemplary embodiment may be any apparatus which can communicate with the communication unit 410.

Figure 22:
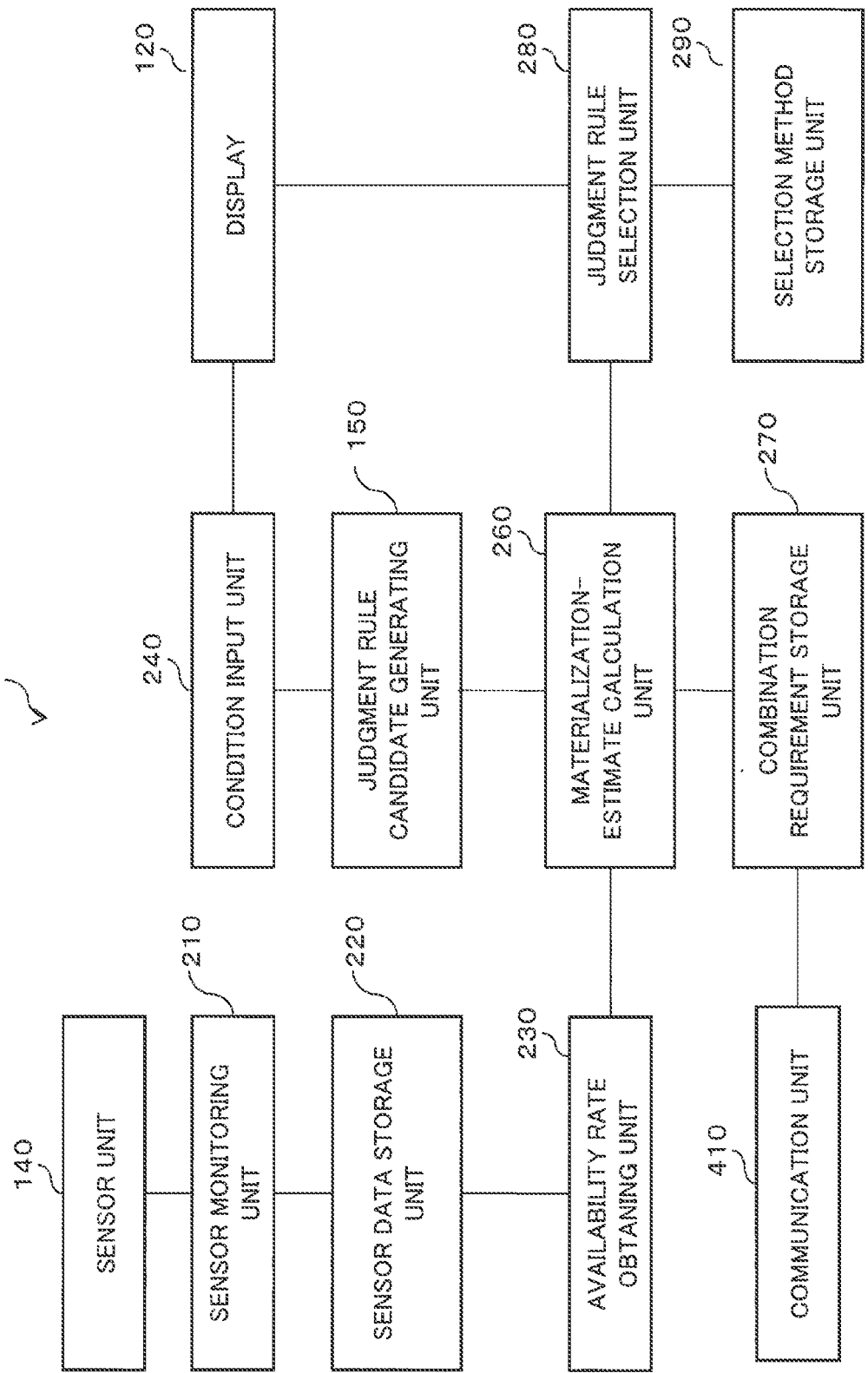
FIG. 22 is a block diagram illustrating a configuration of the fourth exemplary embodiment of the invention.

The information processing apparatus 400 of the exemplary embodiment is described in detail. FIG. 22 is a block diagram illustrating a configuration of the fourth exemplary embodiment of the invention.

Referring to FIG. 22, the information processing apparatus 400 of the exemplary embodiment further includes the communication unit 410 compared with the information processing apparatus 200 of the second exemplary embodiment. In the second exemplary embodiment, the materialization-estimate calculation unit 260 calculates the judgment rule materialization estimate value 655 of each of the judgment rule candidates 653 on the basis of fixed contents included in the combination requirement storage unit 270. In the exemplary embodiment, the communication unit 410 receives the combination requirement 779 which is not included in the combination requirement storage unit 270 from the storage apparatus 491 of the external apparatus 490 and stores it in the combination requirement storage unit 270.

An effect of the exemplary embodiment is to enable to define the judgment rule for achieving timing of information notification with high accuracy without troublesome setup works, in addition to the effect of the second exemplary embodiment.

That is because the combination requirement 779 which is not stored in the combination requirement storage unit 270 of the information processing apparatus 400 is obtained from the storage apparatus 491 of the external apparatus 490 through the communication unit 410.

Fifth Exemplary Embodiment

A fifth exemplary embodiment of the invention is described in detail with reference to drawings.

Figure 23:
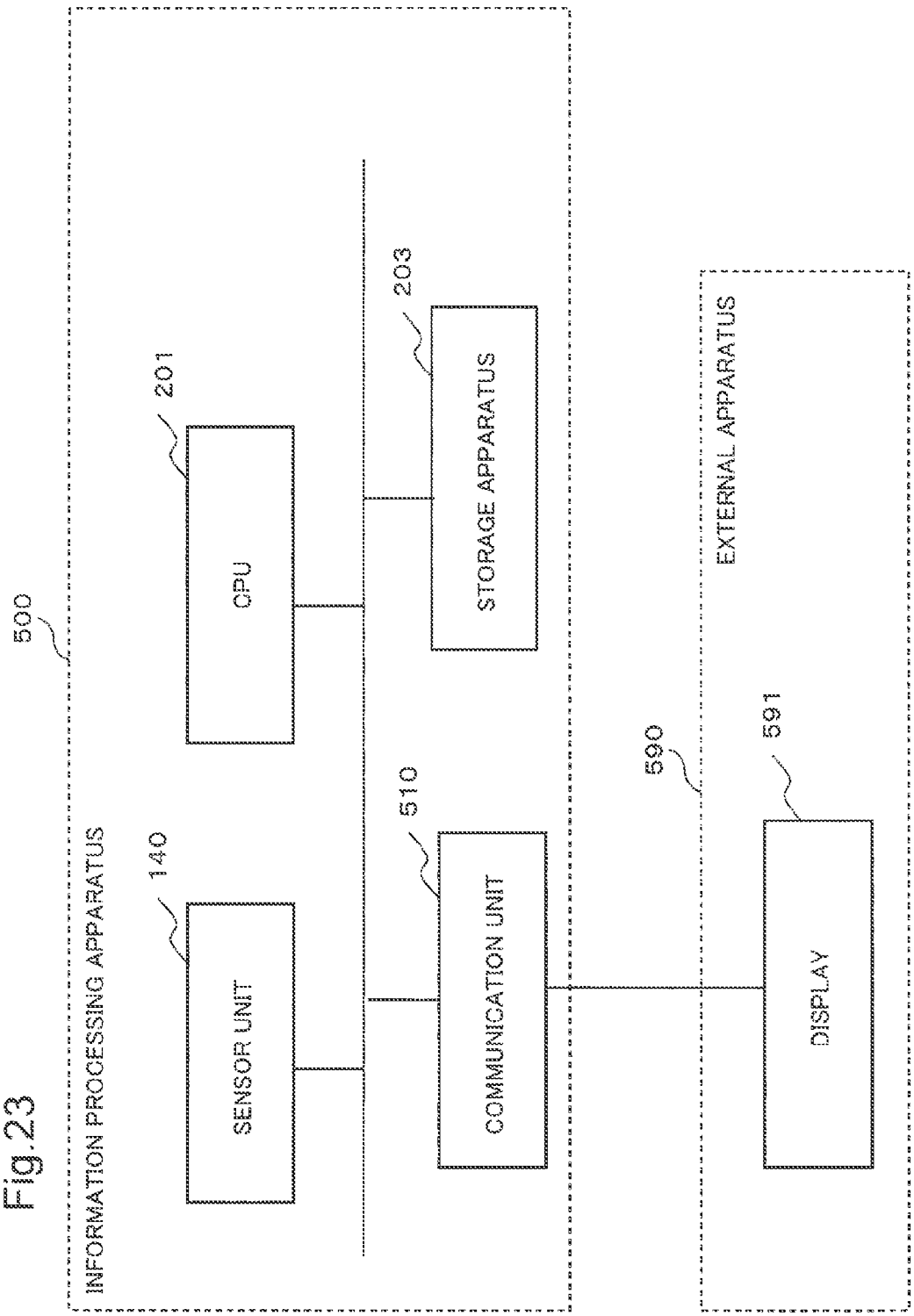
FIG. 23 is a block diagram illustrating a hardware configuration of a fifth exemplary embodiment of the invention.

FIG. 23 is a block diagram illustrating a hardware configuration of the fifth exemplary embodiment of the invention.

Referring to FIG. 23, the fifth exemplary embodiment is composed of an information processing apparatus 500 and an external apparatus 590.

The external apparatus 590 includes a display 591. The information processing apparatus 500 further includes a communication unit 510.

The communication unit 510 sends display information to the display 591 included in the external apparatus 590. The display information is, for example, candidate information of the condition 749 and the notification amount 691 at condition inputting, or the selected judgment rule. The display 591 in the external apparatus 590 of the exemplary embodiment may be any apparatus which can communicate with the communication unit 510.

Figure 24:
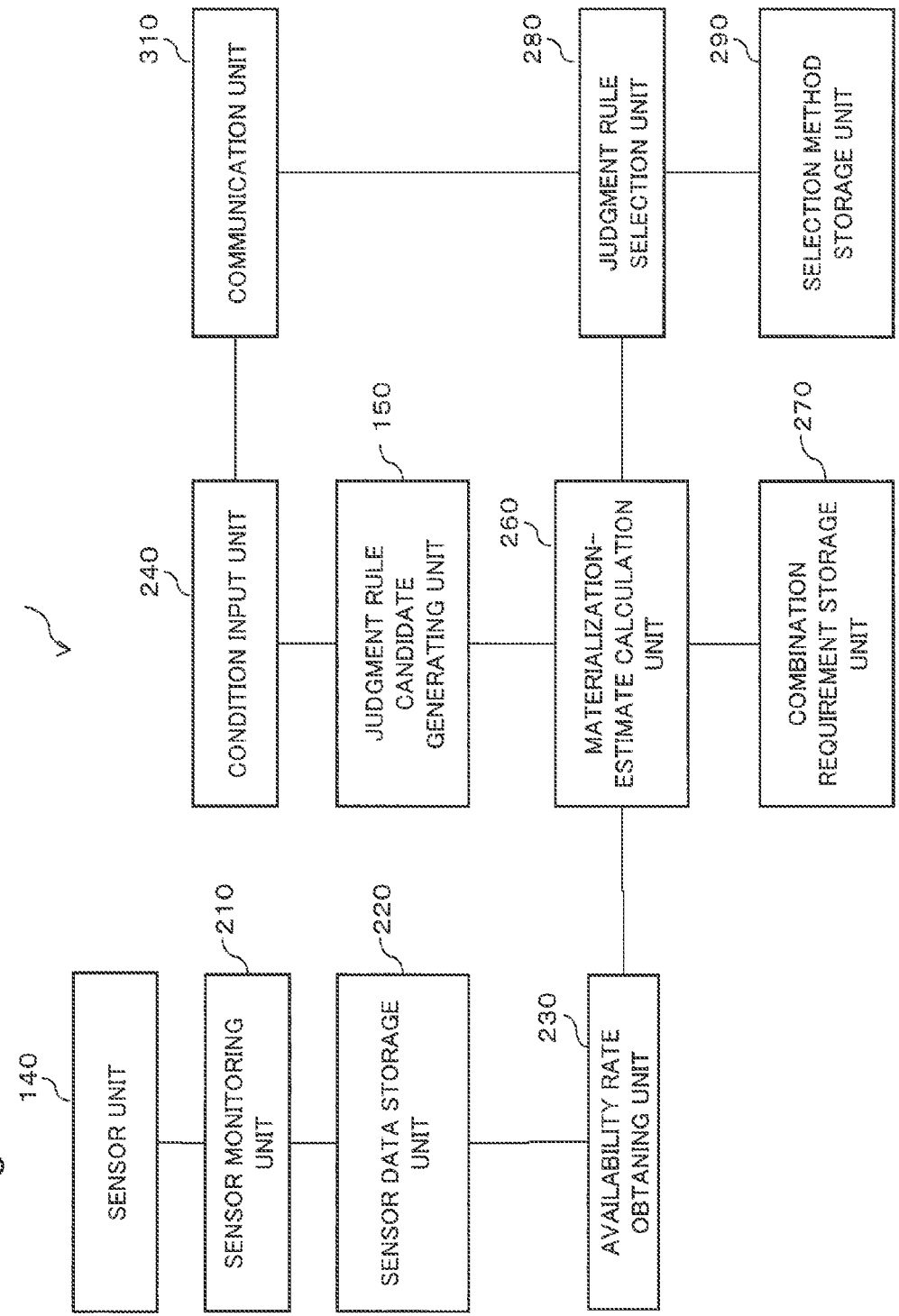
FIG. 24 is a block diagram illustrating a configuration of the fifth exemplary embodiment of the invention.

Next, the information processing apparatus 500 of the exemplary embodiment is explained in detail. FIG. 24 is a block diagram illustrating a configuration of the fifth exemplary embodiment of the invention, Referring to FIG. 24, the information processing apparatus 500 of the exemplary embodiment further includes the communication unit 510 compared with the information processing apparatus 200 of the second exemplary embodiment. In the second exemplary embodiment, the display information is displayed on the display 120 of the information processing apparatus 200. In the exemplary embodiment, the communication unit 410 sends the display information to the display 591 of the external apparatus 590, and the display 591 displays the display information.

An effect of the exemplary embodiment is to enable to obtain the same effect as the first to fourth exemplary embodiments even though the information processing apparatus 500 without the display 120 selects the judgment rule.

That is because the information processing apparatus 500 sends the display information to the display 591 of the external apparatus 590.

Modified Example of the Exemplary Embodiment

Figure 25:
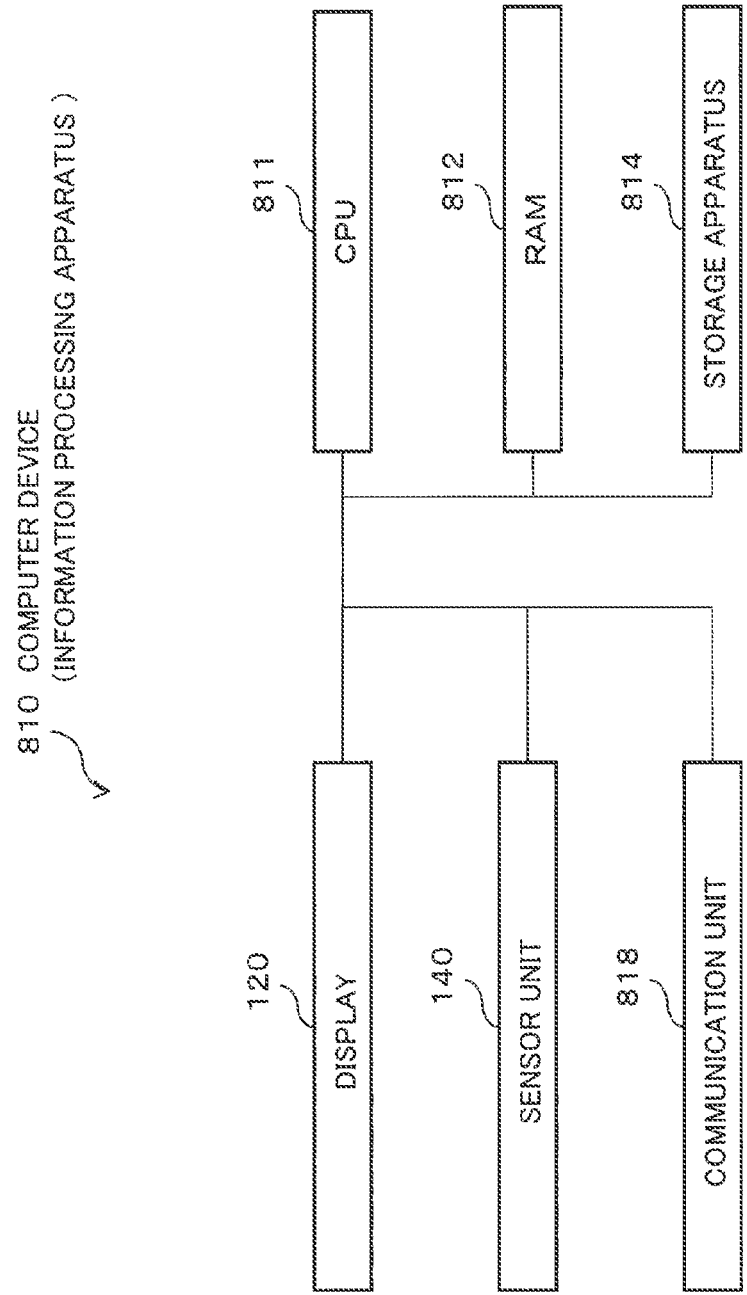
FIG. 25 is a block diagram illustrating a configuration of the exemplary embodiment using a computer device of the invention.

The information processing apparatuses 100, 200, 300, 400 and 500 may be configured by a general-purpose computer device 810 shown in FIG. 25. FIG. 25 is a block diagram illustrating a configuration of the exemplary embodiment using a computer device of the invention.

Referring to FIG. 25, the computer device 810 includes a CPU 811, a RAM (Random Access Memory) 812, and a storage apparatus (storage medium, e.g. hard disc device) 814.

As shown in FIG. 25, the computer device 810 may include the display 120, the sensor unit 140 and a communication unit 818.

In this case, the judgment rule candidate generating unit 150, the materialization-estimate calculation unit 160, the judgment rule selection unit 180, the sensor monitoring unit 210, the sensor data storage unit 220, the availability rate obtaining unit 230, the condition input unit 240, the materialization-estimate calculation unit 260, the combination requirement storage unit 270, the judgment rule selection unit 280, and the selection method storage unit 290 which are included in the information processing apparatuses 100, 200, 300, 400 and 500 correspond to a CPU 311, a RAM 312 and a storage device 314. The communication units 310, 410, and 510 correspond to the communication unit 818.

A program executing the CPU 811 is stored in the storage apparatus 814. The CPU 811 writes the program stored in the storage apparatus 814 into the RAM 812 and performs predetermined processing, based on the program, which is explained using flowcharts illustrating operations of each exemplary embodiment.

The display 120, the sensor unit 140, the communication unit 818 (communication units 310, 410, and 510) are explained in each exemplary embodiment.

Figure 26:
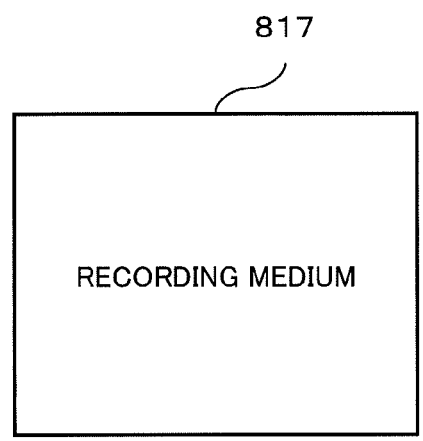
FIG. 26 is a diagram showing an example of a recording medium in which a program of the present invention is recorded.

FIG. 26 is a diagram illustrating an example of a recording medium (storing medium) 817 which records (stores) a program. The recording medium 817 is a non-volatile recording medium storing information permanently. The recording medium 817 may be a volatile recording medium storing information temporarily. The recording medium 817 stores the program (software) causing the computer 810 (CPU 311) to execute operations shown in, for example, FIG. 10, FIG. 17, and FIG. 18. The recording medium 817 may further store any program and data.

The recording medium 817 storing codes of the program (software) may be supplied to the computer 810, and the CPU 811 may read and perform the codes of the program stored on the recording medium 817. The CPU 811 may store the codes in the RAM 812. Each of the exemplary embodiments includes an exemplary embodiment of the recording medium 817 storing temporarily or permanently the program executed by the computer 810 (CPU 811).

Each of the elements explained in each exemplary embodiment is not necessarily configured discretely. For example, a plurality of elements may be configured as one module, or one element may be configured as a plurality of modules. The element may be a part of the different element, or a part of the element may overlap a part of the different element.

In the exemplary embodiments, a plurality of operations is described in order using a flowchart form. However, the order of the descriptions does not fix the order of performances of a plurality of the operations. When the exemplary embodiments are performed, the order of a plurality of the operations may be changed without influencing the contents.

In the exemplary embodiments, a plurality of the operations is not necessarily performed on different timing. An operation may occur while a different operation is performed, or timing of performance of an operation may overlap timing of performance of a different operation partially or fully.

In the exemplary embodiments, an operation may become a trigger of a different operation. However, the exemplary embodiments do not restrict relation between an operation and the other operations. When the exemplary embodiments are performed, the relation of a plurality of the operations may be changed without influencing the contents. The specific description on each of the operations of each of the elements does not restrict the operations of the elements. When the exemplary embodiments are performed, the specific operation of each of the elements may be changed without influencing the function, the performance, and the other characteristics.

Each of the elements of the exemplary embodiments may be configured using hardware, software, or a combination of hardware and software, when necessary, if possible.

Each of the elements may be configured independently, as a combination thereof, or separately, and is not limited to the description of the exemplary embodiments.

The whole or part of the exemplary embodiments disclosed above can be described as, but not limited to, the following supplementary notes.

[Supplementary Note 1]

A computer-implemented information processing apparatus comprising:

a CPU; and a memory storing instructions to be executed by the CPU by causing the CPU to execute:

an judgment rule candidate generating unit which generates a judgment rule candidate that is a combination of a plurality of conditions combined on the basis of a rule given in advance;

a materialization-estimate calculation unit which calculates a judgment rule materialization estimate value indicating a materialization frequency estimate for each of said judgment rule candidates, on the basis of a sensor availability rate indicating an availability rate a sensor in a specific period of time; and a judgment rule selection unit which selects a judgment rule from among the judgment rule candidates, on the basis of said judgment rule materialization estimate value and a notification amount indicating a desired notification frequency of information.

[Supplementary Note 2]

The computer-implemented information processing apparatus of supplementary note 1, wherein said materialization-estimate calculation unit calculates said judgment rule materialization estimate value indicating the materialization frequency estimate of a group of the conditions for each of said judgment rule candidates, on the basis of said sensor availability rate and a combination requirement indicating a combination of one or more of said sensors being required for materialization judgment for each of said conditions.

[Supplementary Note 3]

The computer-implemented information processing apparatus of supplementary note 1 or 2, further comprising;

a sensor monitoring unit which obtains a utilization advisability state of said sensor from said sensor;

a sensor data storage unit which stores a sensor utilization advisability state that is a combination of said utilization advisability state and a date and time on when said utilization advisability state is obtained; and an availability rate obtaining unit which calculates said sensor availability rate on the basis of said sensor utilization advisability state.

[Supplementary Note 4]

The computer-implemented information processing apparatus of any one of supplementary notes 1 ato 3, further comprising;

a condition input unit which inputs said condition.

[Supplementary Note 5]

The computer-implemented information processing apparatus of any one of supplementary notes 1 to 4, wherein when the total number of a plurality of the conditions is n (n is a natural number equal to or more than 1), with respect to all combinations of i pieces of the conditions (i is a natural number from 1 to n) selected from the plurality of conditions, said judgment rule candidate generating unit generates the formulas by linking the conditions included in each of the combinations with each other by additions, putting it condition in parentheses, and linking the put one condition in parentheses with the condition which is not included in the conditions in the parentheses but included in said plurality of the conditions by multiplications, and defines said formulas as said judgment rule candidates, by deleting the overlapping said formulas from said formulas generated with respect to all of the i from i=1 to i=n.

[Supplementary Note 6]

The computer-implemented information processing apparatus of any one of supplementary notes 1 to 5, wherein said judgment rule selection unit compares predetermined an upper limit and a lower limit each corresponding to the notification amount with said judgment rule materialization estimate value, and selects said judgment rule from among said judgment rule candidates deleted said judgment rule candidates of which said judgment rule materialization estimate value is outside of a range between said upper limit and said lower limit.

[Supplementary Note 7]

The computer-implemented information processing apparatus of any one of supplementary notes 1 to 6, wherein said conditions include priority and, said judgment rule selection unit selects said judgment rule from among said judgment rule candidates which expresses a product of all said conditions including said priority.

[Supplementary Note 8]

The computer-implemented information processing apparatus of supplementary note 6, wherein said judgment rule selection unit regards said selected judgment rules as a selection result when the number of said selected judgment rules accords with a setting value given in advance, and regards the number corresponding to said setting value of said selected judgment rule in order to said judgment rule materialization estimate values which is nearer to the average value of said upper limit and said lower limit as the selection result when the number of the selected judgment rules exceeds said setting value.

[Supplementary Note 9]

The computer-implemented information processing apparatus of supplementary notes 7, wherein when the number of said selected judgment rules is smaller than the setting value given in advance, said materialization-estimate calculation unit regards said condition with said priority of which said sensor availability rate is the lowest as the condition without said priority and recalculates said judgment rule materialization estimate value, and said judgment rule selection unit reselects said judgment rule on the basis of said recalculated judgment rule materialization estimate value, said notification amount and said selected judgment rule and regards the reselected judgment rule as the selection result.

[Supplementary Note 10]

The computer-implemented information processing apparatus of supplementary note 6 or 8, further comprising:

a combination requirement storage unit which stores said combination requirement;

a selection method storage unit which stores said notification amount, said upper limit, said lower limit and said setting value; and a display for displaying the judgment rule.

[Supplementary Note 11]

An information processing system, comprising:

at least one first external apparatus including said sensor unit; and the computer-implemented information processing apparatus of supplementary note 3 further including a communication unit which communicates with the sensor unit.

[Supplementary Note 12]

An information processing system, comprising:

at least one second external apparatus including a storage apparatus for storing said combination requirement; and the computer-implemented information processing apparatus of supplementary note 2 further including a communication unit which communicates with said storage apparatus.

[Supplementary Note 13]

An information processing system, comprising:

at least one third external apparatus including a display for displaying said judgment rule; and the computer-implemented information processing apparatus of any one of supplementary notes 1 to 10 further including a communication unit which communicates with said display.

[Supplementary Note 14]

An judgment rule control method, wherein a computer performs:

with respect to a plurality of conditions inputted from a condition input unit, generating a combination of said conditions as a judgment rule candidate on the basis of a rule given in advance;

calculating a judgment rule materialization estimate value indicating a materialization frequency estimate for each of said judgment rule candidates on the basis of a sensor availability rate indicating an availability rate of a sensor in a specific period of time, the sensor availability rate being stored in a sensor data storage unit; and selecting a judgment rule from among said judgment rule candidates on the basis of said calculated judgment rule materialization estimate value and a notification amount indicating a desired notification frequency of information, the notification amount being stored in a selection method storage unit.

[Supplementary Note 15]

The judgment rule control method of supplementary note 14, wherein the calculating said judgment rule materialization estimate value includes calculating the judgment rule materialization estimate value indicating materialization frequency estimate of a group of said conditions for each of said judgment rule candidates, on the basis of said sensor availability rate and a combination requirement indicating a combination of one or more of said sensors being required for materialization judgment for each of said conditions and being stored in a combination requirement storage unit.

[Supplementary Note 16]

The judgment rule control method of supplementary note 14 or 15, wherein the computer performs:

obtaining a utilization advisability state of said sensor from said sensor;

storing a sensor utilization advisability state in the sensor data storage unit, the sensor utilization advisability state being a combination of said utilization advisability state and date and time on when said utilization advisability state is obtained; and calculating said sensor availability rate on the basis of said sensor utilization advisability state stored in said sensor data storage unit.

[Supplementary Note 17]

The judgment rule control method of any one of supplementary notes 14 to 16, wherein said generating the judgment rule candidate includes, when the total number of a plurality of the conditions is n (n is a natural number equal to or more than 1), with respect to all combinations of i pieces of said conditions (i is a natural number from 1 to n) selected from the plurality of conditions, linking the conditions included in each of the combinations by additions, putting it condition in parentheses and linking the put one condition in parentheses with the condition which is not included in the conditions in the parentheses but included in said plurality of the conditions by multiplications, and defines said formulas as said judgment rule candidates, by deleting the overlapping said formulas from said formulas generated with respect to all of the i from i=1 to i=n.

[Supplementary Note 18]

The judgment rule control method of any one of supplementary notes 14 to 17, wherein said selecting the judgment rule includes comparing an upper limit and a lower limit each corresponding to the notification amount stored in the selection method storage unit with said judgment rule materialization estimate value, and selecting said judgment rule from among said judgment rule candidates deleted said judgment rule candidates of which said judgment rule materialization estimate value is outside of a range between said upper limit and said lower limit.

[Supplementary Note 19]

The judgment rule control method of any one of supplementary notes 14 to 18, wherein said conditions include priority and, said selecting the judgment rule includes selecting said judgment rule from among the judgment rule candidates which expresses a product of all said conditions including said priority.

[Supplementary Note 20]

The judgment rule control method of supplementary note 18, wherein said selecting the judgment rule includes regarding said selected judgment rules as a selection result when the number of said selected judgment rules accords with a setting value given in advance, and regarding the number corresponding to said setting value of said selected judgment rule in order to said judgment rule materialization estimate values which is nearer to the average value of said upper limit and said lower limit as the selection result when the number of the selected judgment rules exceeds said setting value.

[Supplementary Note 21]

The judgment rule control method of supplementary note 19, wherein when the number of said selected judgment rules is smaller than the setting value given in advance, said calculating the judgment rule materialization estimate value includes regarding said condition with said priority of which said sensor availability rate is the lowest as the condition without said priority and recalculating said judgment rule materialization estimate value, and said selecting the judgment rule includes reselecting said judgment rule on the basis of said recalculated judgment rule materialization estimate value, said notification amount and said selected judgment rule, and regarding the reselected judgment rule as the selection result.

[Supplementary Note 22]

The judgment rule control method of supplementary note 15, wherein the computer performs:

communicating with a storage apparatus included in an external apparatus and obtaining said combination requirement; and storing said combination requirement in said combination requirement storage unit.

[Supplementary Note 23]

The judgment rule control method of supplementary note 16, wherein the computer performs:

communicating with a sensor unit included in an external apparatus and obtaining said utilization availability state of said sensor included in said sensor unit; and storing said obtained utilization availability state with date and time of occurrence of the state in said sensor data storage unit.

[Supplementary Note 24]

The judgment rule control method of any one of supplementary notes 14 to 23, wherein the computer performs:

communicating with a display included in an external apparatus and transmitting said judgment rule to be displayed on said display.

[Supplementary Note 25]

A non-transitory computer-readable recording medium having a program for causing a computer to execute, a process of generating a combination of conditions as a judgment rule candidate on the basis of a rule given in advance, with respect to a plurality of said conditions inputted from a condition input unit;

a process of calculating an judgment rule materialization estimate value indicating a materialization frequency estimate for each of said judgment rule candidates on the basis of a sensor availability rate indicating an availability rate of a sensor in a specific period of time, the sensor availability rate being stored in a sensor data storage unit; and a process of selecting a judgment rule from among said judgment rule candidates on the basis of said judgment rule materialization estimate value and a notification amount indicating a desired notification frequency of information, the notification amount being stored in a selection method storage unit.

[Supplementary Note 26]

The medium having the program of supplementary note 25, wherein said process of calculating the judgment rule materialization estimate value includes calculating the judgment rule materialization estimate value indicating the materialization frequency estimate of a group of said conditions for each of said judgment rule candidates, on the basis of said sensor availability rate, and a combination requirement indicating a combination of one or more of said sensors being required for materialization judgment for each of said conditions and being stored in a combination requirement storage unit.

[Supplementary Note 27]

The medium having the program of supplementary notes 25 or 26, further comprising:

a process of obtaining a utilization advisability state of said sensor from said sensor;

a process of storing a sensor utilization advisability state that is a combination of said utilization advisability state and date and time on when said utilization advisability state is obtained, in the sensor data storage unit; and a process of calculating said sensor availability rate on the basis of said sensor utilization advisability state stored in the sensor data storage unit.

[Supplementary Note 28]

The medium having the program of any one of supplementary notes 25 to 27, wherein said process of the generating the judgment rule candidate includes, when the total number of a plurality of the conditions is n (n is a natural number equal to or more than 1), with respect to all combinations of i pieces of said conditions (i is a natural number from 1 to n) selected from the plurality of conditions, linking the conditions included in each of the combinations by additions, putting it condition in parentheses and linking the put one condition in parentheses with the condition which is not included in the conditions in the parentheses but included in said plurality of the conditions by multiplications, and defines said formulas as said judgment rule candidates, by deleting the overlapping said formulas from said formulas generated with respect to all of the i from i=1 to i=n.

[Supplementary Note 29]

The medium having the program of any one of supplementary notes 25 to 28, wherein said process of the selecting the judgment rule includes comparing an upper limit and a lower limit each corresponding to the notification amount stored in the selection method storage unit with said judgment rule materialization estimate value, and selecting said judgment rule from among said judgment rule candidates deleted said judgment rule candidates of which said judgment rule materialization estimate value is outside of a range between said upper limit and said lower limit.

[Supplementary Note 30]

The medium having the program of any one of supplementary notes 25 to 29, wherein said conditions include priority and, said process of selecting the judgment rule includes selecting said judgment rule from among the judgment rule candidates which expresses a product of all said conditions including said priority.

[Supplementary Note 31]

The medium having the program of supplementary note 29, wherein said process of selecting the judgment rule includes regarding said selected judgment rules as the selection result when the number of said selected judgment rules accords with a setting value given in advance, and regarding the number corresponding to said setting value of said selected judgment rule in order to said judgment rule materialization estimate values which is nearer to the average value of said upper limit and said lower limit as the selection result when the number of the selected judgment rules exceeds said setting value.

[Supplementary Note 32]

The medium having the program of supplementary note 30, wherein when the number of said selected judgment rules is smaller than the setting value given in advance, said process of the calculating the judgment rule materialization estimate value includes regarding said condition with said priority of which said sensor availability rate is the lowest as the condition without said priority and recalculating said judgment rule materialization estimate value, said the process of the selecting the judgment rule includes reselecting said judgment rule on the basis of said recalculated judgment rule materialization estimate value, said notification amount and said selected judgment rule and regarding the reselected judgment rule as the selection result.

[Supplementary Note 33]

The medium having the program of supplementary note 26, further comprising:

a process of communicating with a storage apparatus included in an external apparatus and obtaining said combination requirement; and a process of storing said combination requirement in said combination requirement storage unit.

[Supplementary Note 34]

The medium having the program of supplementary note 27, further comprising:

a process of communicating with a sensor unit included in an external apparatus to obtain said utilization advisability state of said sensor included in the sensor unit; and a process of storing said obtained utilization advisability state with date and time of occurrence of the state in said sensor data storage unit.

[Supplementary Note 35]

The medium having the program of any one of supplementary notes 25 to supplementary note 34, further comprising:

a process of communicating with a display included in an external apparatus to transmit said judgment rule to be displayed on said display.

[Supplementary Note 36]

An information processing apparatus, comprising:

judgment rule candidate generating means for generating judgment rule candidates that is a combination of a plurality of conditions combined on the basis of a rule given in advance;

materialization-estimate calculation means for calculating a judgment rule materialization estimate value indicating a materialization frequency estimate for each of said judgment rule candidates, on the basis of a sensor availability rate given in advance indicating an availability rate of a sensor in a specific period of time; and judgment rule selection means for selecting a judgment rule from among the judgment rule candidates, on the basis of said judgment rule materialization estimate value and a predetermined notification amount indicating a desired notification frequency of information.

While having described an invention of the present application referring to the embodiments and the examples, the invention of the present application is not limited to the above mentioned embodiments and examples. It is to be understood that to the configurations and details of the invention of the present application, various changes can be made within the scope of the invention of the present application by those skilled in the art.

This application is based upon and claims the benefit of priority from Japanese Patent Application No. 2010-053176 filed on Mar. 10, 2010, the disclosure of which is incorporated herein in its entirety by reference.

DESCRIPTION OF THE REFERENCE NUMERALS

100 INFORMATION PROCESSING APPARATUS
120 DISPLAY
140 SENSOR UNIT
150 JUDGMENT RULE CANDIDATE GENERATING UNIT
160 MATERIALIZATION-ESTIMATE CALCULATION UNIT
180 JUDGMENT RULE SELECTION UNIT
200 INFORMATION PROCESSING APPARATUS
201 CPU
203 STORAGE APPARATUS
210 SENSOR MONITORING UNIT
220 SENSOR DATA STORAGE UNIT
230 AVAILABILITY RATE OBTAINING UNIT
240 CONDITION INPUT UNIT
260 MATERIALIZATION-ESTIMATE CALCULATION UNIT
270 COMBINATION REQUIREMENT STORAGE UNIT
280 JUDGMENT RULE SELECTION UNIT
290 SELECTION METHOD STORAGE UNIT
300 INFORMATION PROCESSING APPARATUS
304 SENSOR UNIT
305 COMMUNICATION APPARATUS
310 COMMUNICATION UNIT
390 EXTERNAL APPARATUS GROUP
391 SENSOR UNIT
400 INFORMATION PROCESSING APPARATUS
410 COMMUNICATION UNIT
490 EXTERNAL APPARATUS
491 STORAGE APPARATUS
500 INFORMATION PROCESSING APPARATUS
510 COMMUNICATION UNIT
590 EXTERNAL APPARATUS
591 DISPLAY
611 CONDITION OCCURRENCE DATE AND TIME
612 SENSOR IDENTIFIER
613 UTILIZATION ADVISABILITY STATE
619 SENSOR UTILIZATION ADVISABILITY STATE
631 SENSOR IDENTIFIER
632 AVAILABILITY RATE
639 SENSOR AVAILABILITY RATE
639 AVAILABILITY RATE
640 CONDITION LIST
649 CONDITION
651 CONDITION CONTENTS
652 CONDITION NUMBER
653 JUDGMENT RULE CANDIDATE
653 EACH JUDGMENT RULE CANDIDATE
654 JUDGMENT RULE CANDIDATE
655 JUDGMENT RULE MATERIALIZATION-ESTIMATE VALUE
672 SENSOR IDENTIFIER
679 COMBINATION REQUIREMENT
690 NOTIFICATION AMOUNT INFORMATION LIST
691 NOTIFICATION AMOUNT
692 UPPER LIMIT
693 LOWER LIMIT
694 AVERAGE VALUE
699 NOTIFICATION AMOUNT INFORMATION
740 CONDITION LIST
741 CONDITION CONTENTS
742 PRIORITY
749 CONDITION
770 COMBINATION REQUIREMENT LIST
771 CONDITION CONTENTS
772 SENSOR IDENTIFIER
779 COMBINATION REQUIREMENT
10 COMPUTER DEVICE
811 CPU
812 RAM
814 STORAGE APPARATUS
816 DISPLAY
817 RECORDING MEDIUM
818 COMMUNICATION UNIT

The invention claimed is:

1. A computer-implemented information processing apparatus comprising:
a CPU; and
a memory storing instructions to be executed by the CPU, the instructions causing the CPU to implement:
a judgment rule candidate generating unit which generates a judgment rule candidate that is a combination of a plurality of conditions combined on the basis of a rule given in advance;
a materialization-estimate calculation unit which calculates a judgment rule materialization estimate value indicating a materialization frequency estimate for each of said judgment rule candidates, on the basis of a sensor availability rate indicating an availability rate of a sensor in a specific period of time which detects a status of a device;
a judgment rule selection unit which selects a judgment rule from among the judgment rule candidates, on the basis of said judgment-rule materialization estimate value and a notification amount indicating a desired notification frequency of information wherein:
said conditions include priority;

said judgment rule selection unit selects said judgment rule from among said judgment rule candidates which express a product of all said conditions including said priority;

wherein when the number of said selected judgment rules is smaller than the setting value given in advance:

said materialization-estimate calculation unit regards said condition with said priority of which said sensor availability rate is the lowest as the condition without said priority and recalculates said judgment rule materialization estimate value; and said judgment rule selection unit reselects said judgment rule on the basis of said recalculated judgment rule materialization estimate value, said notification amount and said selected judgment rule and regards the reselected judgment rule as the selection result.

2. The computer-implemented information processing apparatus of claim 1, wherein:

said materialization-estimate calculation unit calculates said judgment-rule materialization estimate value indicating the materialization frequency estimate of a group of the conditions for each of said judgment rule candidates, on the basis of said sensor availability rate and a combination requirement indicating a combination of one or more of said sensors being required for materialization judgment for each of said conditions.

3. The computer-implemented information processing apparatus of claim 2, wherein:

said judgment rule selection unit compares a predetermined upper limit and a predetermined lower limit, each corresponding to the notification amount with said judgment-rule materialization estimate value, and selects said judgment rule from among said judgment rule candidates deleted said judgment rule candidates of which said judgment-rule materialization estimate value is outside of a range between said upper limit and said lower limit.

4. The computer-implemented information processing apparatus of claim 3, wherein said judgment rule selection unit regards said selected judgment rules as a selection result when the number of said selected judgment rules accords with a setting value given in advance, and regards the number corresponding to said setting value of said selected judgment rule in order to said judgment-rule materialization estimate values which are nearer to the average value of said upper limit and said lower limit as the selection result when the number of the selected judgment rules exceeds said setting value.

5. The computer-implemented information processing apparatus of claim 4, further comprising:

a combination requirement storage unit which stores said combination requirement;

a selection method storage unit which stores said notification amount, said upper limit, said lower limit and said setting value; and a display for displaying the judgment rule.

6. The computer-implemented information processing apparatus of claim 1, further the CPU further implementing:

a sensor monitoring unit which obtains a utilization advisability state of said sensor from said sensor;

a sensor data storage unit which stores a sensor utilization advisability state that is a combination of said utilization advisability state and a date and time on when said utilization advisability state is obtained; and an availability rate obtaining unit which calculates said sensor availability rate on the basis of said sensor utilization advisability state.

7. An information processing system, comprising:

at least one second external apparatus including a storage apparatus for storing said combination requirement; and the computer-implemented information processing apparatus of claim 6 further including a communication unit which communicates with said storage apparatus.

8. The computer-implemented information processing apparatus of claim 1, the CPU further implementing a condition input unit which inputs said condition.

9. An information processing system, comprising:

at least one first external apparatus including said sensor unit; and the computer-implemented information processing apparatus of claim 8 further including a communication unit which communicates with the sensor unit.

10. The computer-implemented information processing apparatus of claim 1, wherein:

when the total number of a plurality of the conditions is n (n is a natural number equal to or more than 1), with respect to all combinations of i pieces of the conditions (i is a natural number from 1 to n) selected from the plurality of conditions, said judgment-rule candidate generating unit generates the formulas by linking the conditions included in each of the combinations with each other by addition, putting their condition in parentheses, and linking the put one condition in parentheses with the condition which is not included in the conditions in the parentheses but included in said plurality of the conditions by multiplication, and defining said formulas as said judgment-rule candidates, by deleting the overlapping said formulas from said formulas generated with respect to all of the i from i=1 to i=n.

11. An information processing system, comprising:

at least one third external apparatus including a display for displaying said judgment rule; and the computer-implemented information processing apparatus of claim 1 further including a communication unit which communicates with said display.

12. A judgment rule control method, wherein a computer performs:

with respect to a plurality of conditions inputted from a condition input unit, generating a combination of said conditions as a judgment rule candidate on the basis of a rule given in advance;

calculating a judgment rule materialization estimate value indicating a materialization frequency estimate for each of said judgment rule candidates on the basis of a sensor availability rate indicating an availability rate of a sensor, in a specific period of time which detects a status of a device, the sensor availability rate being stored in a sensor data storage unit;

selecting a judgment rule from among said judgment rule candidates on the basis of said calculated judgment rule materialization estimate value and a notification amount indicating a desired notification frequency of information, the notification amount being stored in a selection method storage unit wherein;

said conditions include priority;

said selecting the judgment rule includes selecting said judgment rule from among the judgment rule candidates which express a product of all said conditions including, said priority;

wherein when the number of said selected judgment rules is smaller than the setting value given in advance:

said calculating the judgment rule materialization estimate value includes regarding said condition with said priority of which said sensor availability rate is the lowest as the condition without said priority and recalculating said judgment rule materialization estimate value; and said selecting the judgment rule includes reselecting said judgment rule on the basis of said recalculated judgment rule materialization estimate value, said notification amount and said selected judgment rule, and regarding the reselected judgment rule as the selection result.

13. The judgment rule control method of claim 12, wherein the calculating said judgment-rule materialization estimate value comprises:

calculating the judgment-rule materialization estimate value indicating materialization frequency estimate of a group of said conditions for each of said judgment rule candidates, on the basis of said sensor availability rate and a combination requirement indicating a combination of one or more of said sensors being for materialization judgment for each of said conditions and being stored in a combination requirement storage unit.

14. The judgment rule control method of claim 13, wherein the computer performs:

communicating with a storage apparatus included in an external apparatus and obtaining said combination requirement; and storing said combination requirement in said combination requirement storage unit.

15. The judgment rule control method of claim 12, wherein the computer performs:

obtaining a utilization advisability state of said sensor from said sensor;

storing a sensor utilization advisability state in the sensor data storage unit, the sensor utilization advisability state being a combination of said utilization advisability state and date and time at which said utilization advisability state is obtained; and calculating said sensor availability rate on the basis of said sensor utilization advisability state stored in said sensor data storage unit.

16. The judgment rule control method of claim 15, wherein the computer performs:

communicating with a sensor unit included in an external apparatus and obtaining said utilization availability state of said sensor included in said sensor unit; and storing said obtained utilization availability state with date and time of occurrence of the state in said sensor data storage unit.

17. The judgment rule control method of claim 12, wherein said generating the judgment rule candidate includes, when the total number of a plurality of the conditions is n (n is a natural number equal to or more than 1), with respect to all combinations of i pieces of said conditions (i is a natural number from 1 to n) selected from the plurality of conditions, linking the conditions included in each of the combinations by addition, putting their condition in parentheses and linking the put one condition in parentheses with the condition which is not included in the conditions in the parentheses but included in said plurality of the conditions by multiplication, and defining said formulas as said judgment-rule candidates, by deleting the overlapping said formulas from said formulas generated with respect to all of the i from i=1 to i=n.

18. The judgment rule control method of claim 12, wherein said selecting the judgment rule includes comparing an upper limit and a lower limit, each corresponding to the notification amount stored in the selection method storage unit with said judgment-rule materialization estimate value, and selecting said judgment rule from among said judgment rule candidates deleted said judgment rule candidates of which said judgment-rule materialization estimate value is outside of a range between said upper limit and said lower limit.

19. The judgment rule control method of claim 18, wherein said selecting the judgment rule includes regarding said selected judgment rules as a selection result when the number of said selected judgment rules accords with a setting value given in advance, and regarding the number corresponding to said setting value of said selected judgment rule in order to said judgment-rule materialization estimate values which are near to the average value of said upper limit and said lower limit as the selection result when the number of the selected judgment rules exceeds said setting value.

20. The judgment rule control method of claim 12, wherein the computer performs communicating with a display included in an external apparatus and transmitting said judgment rule to be displayed on said display.

21. A non-transitory computer-readable recording medium having a program for causing a computer to execute:

generating a combination of conditions as a judgment rule candidate on the basis of a rule given in advance, with respect to a plurality of said conditions inputted from a condition input unit;

calculating an judgment rule materialization estimate value indicating a materialization frequency estimate for each of said judgment rule candidates on the basis of a sensor availability rate indicating an availability rate of a sensor, in a specific period of time which detects a status of a device, the sensor availability rate being stored in a sensor data storage unit;

selecting a judgment rule from among said judgment rule candidates on the basis of said judgment-rule materialization estimate value and a notification amount indicating a desired notification frequency of information, the notification amount being stored in a selection method storage unit, wherein:

said conditions include priority;

said process of selecting the judgment rule includes selecting said judgment rule from among the judgment rule candidates which express a product of all said conditions including said priority;

wherein when then number of said selected judgment rules is smaller than the setting value given in advance:

said process of the calculating the judgment rule materialization estimate value includes regarding said condition with said priority of which said sensor availability rate is the lowest as the condition without said priority and recalculating said judgment rule materialization estimate value; and said selecting the judgment rule includes reselecting said judgment rule on the basis of said recalculated judgment rule materialization estimate value, said notification amount and said selected judgment rule and regarding the reselected judgment rule as the selection result.

22. The medium having the program of claim 21, wherein said process of calculating the judgment-rule materialization estimate value includes:

calculating the judgment-rule materialization estimate value indicating the materialization frequency estimate of a group of said conditions for each of said judgment rule candidates, on the basis of said sensor availability rate, and a combination requirement indicating a combination of one or more of said sensors being required for materialization judgment for each of said conditions and being stored in a combination requirement storage unit.

23. The medium having the program of claim 22, further comprising:
- of communicating with a storage apparatus included in an external apparatus and obtaining said combination requirement; and
- of storing said combination requirement in said combination requirement storage unit.

24. The medium having the program of claim 21, further comprising:
- obtaining a utilization advisability state of said sensor from said sensor;
- storing a sensor utilization advisability state that is a combination of said utilization advisability state and date and time on when said utilization advisability state is obtained, in the sensor data storage unit; and
- calculating said sensor availability rate on the basis of said sensor utilization advisability state stored in the sensor data storage unit.

25. The medium having the program of claim 24, further comprising:
- communicating with a sensor unit included in an external apparatus to obtain said utilization advisability state of said sensor included in the sensor unit; and
- storing said obtained utilization advisability state with date and time of occurrence of the state in said sensor data storage unit.

26. The medium having the program of claim 21, wherein said the generating the judgment rule candidate includes, when the total number of a plurality of the conditions is n (n is a natural number equal to or more than 1), with respect to all combinations of i pieces of said conditions (i is a natural number from 1 to n) selected from the plurality of conditions, linking the conditions included in each of the combinations by addition, putting their condition in parentheses and linking the put one condition in parentheses with the condition which is not included in the conditions in the parentheses but included in said plurality of the conditions by multiplication, and defining said formulas as said judgment-rule candidates, by deleting the overlapping said formulas from said formulas generated with respect to all of the i from i=1 to i=n.

27. The medium having the program of claim 21, wherein said process of the selecting the judgment rule includes comparing an upper limit and a lower limit each corresponding to the notification amount stored in the selection method storage unit with said judgment-rule materialization estimate value, and selecting said judgment rule from among said judgment rule candidates deleted said judgment rule candidates of which said judgment-rule materialization estimate value is outside of a range between said upper limit and said lower limit.

28. The medium having the program of claim 27, wherein said selecting the judgment rule includes regarding said selected judgment rules as the selection result when the number of said selected judgment rules accords with a setting value given in advance, and regarding the number corresponding to said setting value of said selected judgment rule in order to said judgment-rule materialization estimate values which are near to the average value of said upper limit and said lower limit as the selection result when the number of the selected judgment rules exceeds said setting value.

29. The medium having the program of claim 21, further comprising:
- communicating with a display included in an external apparatus to transmit said judgment rule to be displayed on said display.

30. An information processing apparatus, comprising:
- judgment rule candidate generating means for generating judgment rule candidates that is a combination of a plurality of conditions combined on the basis of a rule given in advance;
- materialization-estimate calculation means for calculating a judgment rule materialization estimate value indicating a materialization frequency estimate for each of said judgment rule candidates, on the basis of a sensor availability rate given in advance indicating an availability rate of a sensor in a specific period of time which detects a status of a device;
- judgment rule selection means for selecting a judgment rule from among the judgment rule candidates, on the basis of said judgment rule materialization estimate value and a predetermined notification amount indicating a desired notification frequency of information, wherein:
- said conditions include priority;
- said judgement rule selection means include selecting said judgment rule from among the judgment rule candidates which express a product of all said conditions including said priority;
- wherein when then number of said selected judgment rules is smaller than the setting value given in advance:
- said materialization-estimate calculating means for judgment rule materialization estimate value include regarding said condition with said priority of which said sensor availability rate is the lowest as the condition without said priority and recalculating said judgment rule materialization estimate value; and
- said judgment rule selection means for selecting the judgment rule includes reselecting said judgment rule on the basis of said recalculated judgment rule materialization estimate value, said notification amount and said selected judgment rule and regarding the reselected judgment rule as the selection result.

* * * * *